United States Patent
Lipski et al.

(10) Patent No.: US 7,359,410 B2
(45) Date of Patent: Apr. 15, 2008

(54) APPARATUS AND METHOD FOR INCREASING OPTICAL DENSITY OF SONET MULTIPLEXER USING INTEGRAL COMPONENTS

(75) Inventors: Bruce Lipski, Leesburg, VA (US); Gary Miller, Kearneysville, WV (US); David Corp, Clifton, VA (US)

(73) Assignee: Hubbell Incorporated, Orange, CT (US)

( * ) Notice: Subject to any disclaimer, the term of this patent is extended or adjusted under 35 U.S.C. 154(b) by 937 days.

(21) Appl. No.: 10/448,464

(22) Filed: May 30, 2003

(65) Prior Publication Data

US 2004/0240485 A1 Dec. 2, 2004

(51) Int. Cl.
*H04J 3/02* (2006.01)
(52) U.S. Cl. .......................... 370/537; 398/43
(58) Field of Classification Search ............... 370/537, 370/412, 360, 386, 357, 358; 709/238, 202; 398/43–67
See application file for complete search history.

(56) References Cited

U.S. PATENT DOCUMENTS

| | | | |
|---|---|---|---|
| 5,185,736 A | 2/1993 | Tyrrell et al. | 370/55 |
| 5,848,065 A | 12/1998 | Gorshe et al. | 370/376 |
| 6,046,832 A | 4/2000 | Fishman | 359/119 |
| 6,125,111 A * | 9/2000 | Snow et al. | 370/360 |
| 6,272,154 B1 | 8/2001 | Bala et al. | 370/535 |
| 6,332,198 B1 | 12/2001 | Simons et al. | 714/6 |
| 6,389,013 B1 | 5/2002 | Doss et al. | 370/364 |
| 7,111,072 B1 * | 9/2006 | Matthews et al. | 709/238 |
| 2002/0097743 A1 | 7/2002 | Baydar et al. | 370/463 |

OTHER PUBLICATIONS

"O3D3-OC3 to DS3 Miniature SONET Multiplexer" pp. 1-2 (Feb. 2001).

* cited by examiner

*Primary Examiner*—Seema S. Rao
*Assistant Examiner*—Wanda Z Russell
(74) *Attorney, Agent, or Firm*—Stacey J. Longanecker; Alfred N. Goodman; Mark S. Bicks

(57) ABSTRACT

An OC3 to three DS3 SONET multiplexer is provided employing a field programmable gate array and other components in a single Type 400 mechanics card to achieve a form factor that is substantially reduced when compared to existing SONET multiplexers. The OC3 to three DS3 SONET multiplexer has integral optical redundancy and automated provisioning. Manual switches are provided to select continue/drop and line build out for each DS3. Switches are also provided for loopback options. The face plate for the multiplexer provides front access to all of the OC3 and DS3 connectors. The multiplexer is interchangeable with DS3 to DS1 multiplexer cards and WDM cards in a compact M13 SONET enclosure that is particularly useful at wireless cell sites.

12 Claims, 15 Drawing Sheets

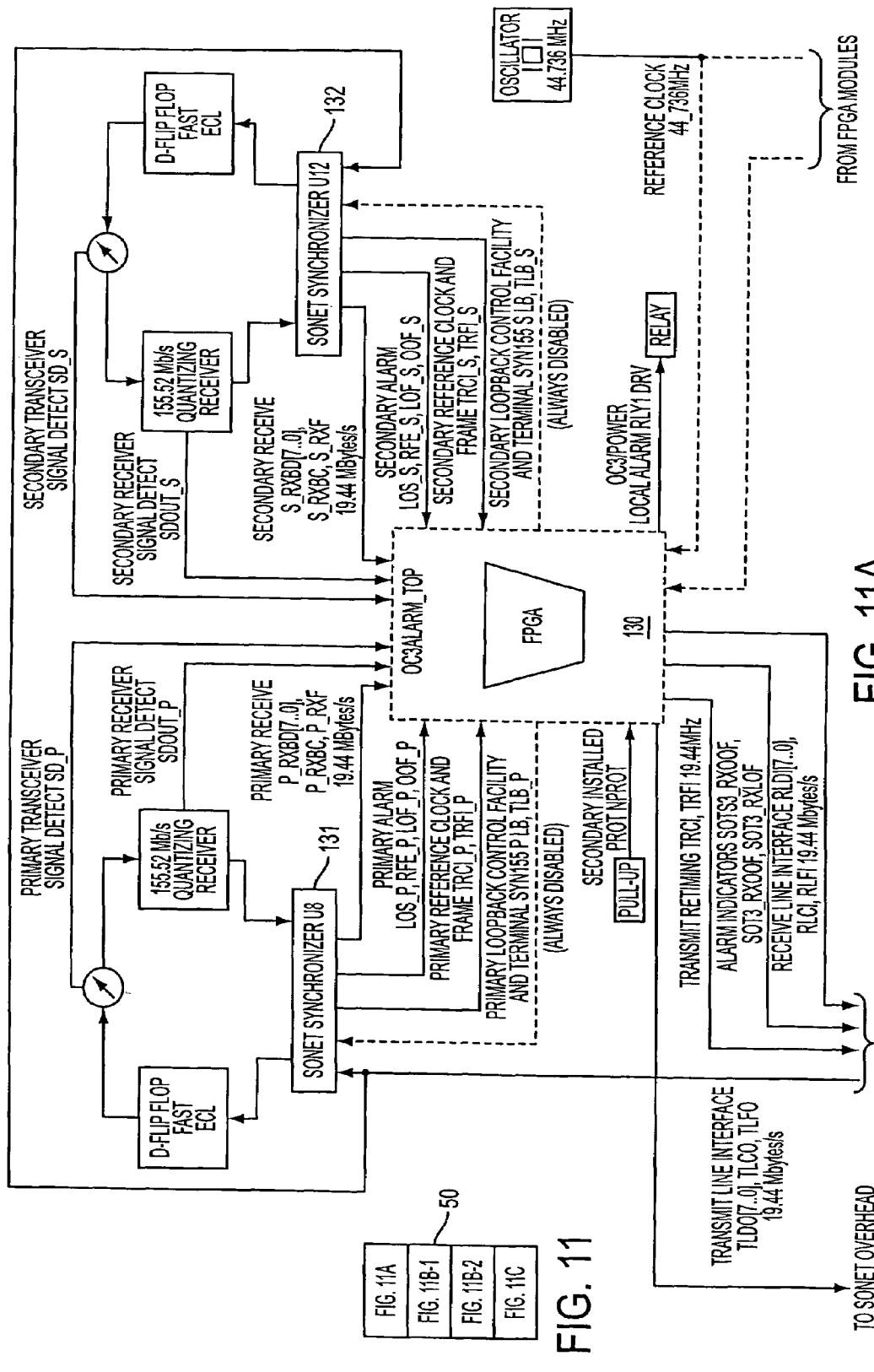

APPARATUS AND METHOD FOR INCREASING OPTICAL DENSITY OF SONET MULTIPLEXER USING INTEGRAL COMPONENTS

CROSS REFERENCE TO RELATED APPLICATIONS

Related subject matter is disclosed in co-pending U.S. patent application Ser. No. 10/448,453 of Bruce Lipski et al., filed even date herewith, entitled "SONET Multiplexer Having Front Panel Access to Electrical and Optical Connectors and Method for Using Same"; in co-pending U.S. patent application Ser. No. 10/448,463 of Bruce Lipski et al., filed even date herewith, entitled "Compact Enclosure for Interchangeable SONET Multiplexer Cards and Method for Using Same"; and in co-pending U.S. patent application Ser. No. 10/448,461 of Bruce Lipski et al., filed even date herewith, entitled "Apparatus And Method For Automatic Provisioning of SONET Multiplexer"; the entire contents of each of these applications being expressly incorporated herein by reference.

FIELD OF THE INVENTION

The present invention relates to an apparatus and method for increasing the optical density of a SONET multiplexer using integral components, as opposed to having to use additional circuit packs for optical redundancy. More specifically, the present invention relates to a method and apparatus for providing a SONET multiplexer with integral switch protection components for optical redundancy.

BACKGROUND OF THE INVENTION

As the demand for high bandwidth, high bit rate communications increases (e.g., to accommodate multimedia applications, in particular), fiber optics technology is rapidly advancing to supply the capacity. SONET (i.e., Synchronous Optical Network) is the communication hierarchy that has been specified by the American National Standards Institute (ANSI) as a standard for a high-speed digital hierarchy for optical fiber. SONET defines optical carrier (OC) levels and electrically equivalent synchronous transport signals (STSs) for the fiber-optic based transmission hierarchy. The SONET standard is described in more detail in ANSI T1.105 and T1.106, and in Bellcore Telecordia Generic Requirements GR-253-CORE and GR-499-CORE, which are incorporated herein by reference.

Before SONET, fiber optic systems in the public telephone network used proprietary architectures, equipment, line codes, multiplexing formats and maintenance procedures. The users of this equipment (e.g., Regional Bell Operating Companies and inter-exchange carriers (IXCs) in the United States, Canada, Korea, and Taiwan, among other countries) desired standards such as SONET so they could employ equipment from different suppliers without experiencing incompatibility problems.

SONET defines a technology for carrying many signals of different capacities through a synchronous, flexible, optical hierarchy using a byte-interleaved multiplexing scheme to simplify multiplexing and provide end-to-end network management. The base signal in SONET is a Synchronous Transport Signal level-1 (STS-1) which operates at 51.84 Megabits per second (Mbps). Higher-level SONET signals are summarized in the following table:

TABLE 1

| SONET Hierarchy | | |
| --- | --- | --- |
| Signal | Bit Rate | Capacity |
| STS-1, OC-1 | 51.840 Mb/s | 28 DS1s or 1 DS3 |
| STS-3, OC-3 | 155.520 Mb/s | 84 DS1s or 3 DS3s |
| STS-12, OC-12 | 622.080 Mb/s | 336 DS1s or 12 DS3s |
| STS-48, OC-48 | 2488.320 Mb/s | 1344 DS1s or 48 DS3s |
| STS-192, OC-192 | 9953.280 Mb/s | 5376 DS1s or 192 DS3s |
| STS-768, OC-768 | 39813.12 Mb/s | 21504 DS1s or 768 DS3s |

Thus, each SONET STS-N electrical signal has a corresponding OC-N optical signal. The OC-N signals are created by converting the STS-N electrical signal to an optical signal. The SONET standard establishes a multiplexing format for using any number of 51.84 Mbps signals as building blocks. For example, an OC-3 (Optical Carrier, Level 3) is a 155.52 Mbps signal (i.e., 3 times 51.84 Mbps), and its electrical signal counterpart is referred to as an STS-3 signal. The STS-1 signal carries a DS3 signal or a number of DS1 or other lower level signals. A SONET STS-3 signal is created by concatenating STS-1 signals.

Telecommunication equipment at central offices (COs), remote terminals (RTs), wireless communication cell sites and other equipment locations is frequently deployed as one or more bays with multiple shelves, wherein each shelf is configured to receive a plurality of communications cards. A backplane is provided in each bay for communication between its cards and shelves, as well as for interbay communication. One of the more common types of equipment to be found at these equipment sites is SONET multiplex equipment which takes lower-rate (tributary) signals, such as DS1 (1.5 Mbps), DS3 (45 Mbps), OC-1 (51.84 Mbps), or OC-3 (155.52 Mbps), and time division multiplexes them into a higher-rate signal such as OC-3 or OC-12 (622.08 Mbps). The SONET multiplex equipment also performs the corresponding demultiplex function of recovering the lower rate tributary signals from an incoming higher-rate signal.

Telecommunications companies are eager to provide as much performance as possible from their existing infrastructure. Their telecommunications systems are primarily based on the DS1 electrical signal hierarchy that uses DS0 data. A DS1 signal is comprised of 24 multiplexed DS0 voice channels. To provide capacity that meets the afore-mentioned demand for more bandwidth and high bit rates, telecommunications companies need equipment that is based on a higher data rate such as DS3 in which DS1 signals are the base signal for data channel multiplexing, as opposed to DS0 signals.

Problems with existing equipment managing DS3 traffic, however, are numerous. For example, DS3 hierarchy-based equipment requires more bay and shelf space in CO, RT, cell sites and other locations where equipment space is already a limited commodity, where bays and shelves are already crowded (e.g., many shelf card slots are filled with a card), and where room to add equipment with new features is very limited or essentially nonexistent.

In addition, previous generations of SONET and asynchronous multiplex equipment have dedicated fixed portions of an equipment shelf to different types/rates of services. For example, separate portions of the shelf are typically reserved for DS1, DS3, and OC3 interface units. Dedicating specific portions of the shelf to specific service types reduces the flexibility of the shelf, and typically leaves wasted shelf space for any given application.

Also, access to the optical connectors on existing multiplexer cards is typically on the front of a card, while access to the electrical connectors is on the back of the shelf. In equipment locations were space is limited, it can be difficult for human operators to gain access to the backs of card slots in a shelf of an equipment bay. A need therefore exists for SONET multiplexer equipment having a reduced form factor, with nondedicated card slots, and with front panel access to both electrical connectors and optical connectors.

To illustrate these disadvantages of existing SONET multiplex equipment, reference will now be made to FIG. 1 which illustrates a Fujitsu SONET multiplexer 10 (i.e., model FLM-150). The Fujitsu Multiplexer 10 requires an entire shelf in a communications bay and dedicated card slots. For example, several cards are needed for DS1 to DS3 multiplexing, several cards are needed for DS3 to OC3 processing, and so on. Thus, a need exists for a SONET multiplexer having at least standard functionality, yet requiring less equipment space.

The Fujitsu Multiplexer 10 is not easily set up or provisioned. The Fujitsu Multiplexer 10 is designed to be everything to everyone in the optical communications environment. Since it is not designed to be compatible with any one particular system, it provides hundreds of choices to the user and must be substantially configured by a user operating a provisioning application on a computer (e.g., a personal computer or PC) before it can even run data through it. The installation, set up and provisioning manual for the Fujitsu Multiplexer 10 is long and considerable training is needed for the user to be able to configure and operate the unit. Further, after such a lengthy and involved configuration phase, the unit may not be subsequently reprovisioned to accommodate a change in the configured data paths. This aspect of the Fujitsu Multiplexer 10 renders its use very cumbersome. Thus, a need exists for SONET multiplexing equipment that requires minimal set up and provisioning, and minimal or no user training. Further, a need exists for SONET multiplexing equipment that does not require connecting the equipment to a computer for provisioning, and that automates much of the provisioning process to simplify it for the user. In addition, a need exists for SONET multiplexing equipment that simplifies provisioning to allow reconfiguration of the equipment for flexible use.

Also, to use the Fujitsu Multiplexer 10 in different applications such as a drop or drop and continue (e.g., ring) application requires more units, which increases cost, and requires more set up and provisioning. A need exists for a SONET multiplexer that can be deployed in different applications with greater functionality, little or no provisioning, and a minimal number of units to minimize cost and malfunctions due, for example, to failed electronics. For example, if four Fujitsu Multiplexers units were to be deployed in a ring configuration, such as that depicted in FIG. 5 and described below, three of the Fujitsu Multiplexers would require substantial provisioning to instruct each of these units regarding which data paths are being dropped and continued and how to cross-connect at each node, as well as alarm conditions, among other configuration data. Thus, a need exists for SONET multiplexing equipment that simplifies provisioning to allow configuration of the equipment for flexible use in different applications.

Providing redundancy of optical paths can present a problem where there is limited equipment space since additional circuit packs are used in conventional SONET multiplexers. Reference is now made to FIG. 2, which depicts another existing SONET multiplexer that is available from Adtran, Inc. The Adtran SONET multiplexer is the Total Access OPTI-3 model which converts OC3 to three DS3s and consists of a rack-mounted shelf device.

SONET multiplexers generally provide redundancy of data paths to enable continued transmission of data after an optical path failure. With continued reference to FIG. 2, a conventional SONET system 12 employs plural multiplexers 20, 20' and 22, 22' at each of the nodes 14 (e.g. a central office) and 16 (e.g. a remote terminal or customer premise), respectively. A path 18 is selected as the primary path and a secondary path 18, is used in the event of primary path failure. In a 1:n redundancy system, wherein n is an integer, n paths are available and n−1 paths are used with the remaining path being a spare. A 1:n system requires communication between the multiplexers to establish which path(s) are in use and which path(s) are reserved for use following a path failure. In a 1+1 redundancy system, the path is selected based on whichever of the two paths is working and no communication between the multiplexers regarding the selected redundant path is required.

Configuring a SONET system with redundancy using the Adtran multiplexer requires at least four multiplexers 20, 20', 22, 22' (i.e., two per node for two optical paths between the nodes). This redundant configuration is disadvantageous over a system having only a single optical path between two multiplexers, and therefore no redundancy, because it requires twice the equipment space and twice the cost for the extra two multiplexers. Further, the redundant system is less reliable in terms of the increased likelihood for electronics failure or equipment failure from heat, for example, due to the additional multiplexer electronics. A need exists for a SONET multiplexer that provides redundancy while minimizing equipment space and cost and maximizing reliability.

SUMMARY OF THE INVENTION

The above-described disadvantages of conventional SONET multiplexers are overcome and a number of advantages are realized by the present invention. The present invention provides a compact SONET multiplexer with integral switch protection to obviate the need for multiple circuit packs at nodes requiring redundant optical links therebetween.

In accordance with the present invention, a SONET multiplexer comprises: (1) a first OC3 port operable to receive and transmit optical signals; (2) a second OC3 port operable to receive and transmit optical signals; (3) at least one DS3 port operable to receive and transmit electrical signals; (4) a first optical interface to receive an optical signal via the first OC3 port and convert it into an electrical signal; (5) a second optical interface to receive an optical signal via the second OC3 port and convert it into an electrical signal; (6) a SONET synchronizer operable to evaluate bits in the electrical signal received from either of the first optical interface and the second optical interface and detect at least one of a plurality of SONET conditions comprising loss of signal, loss of frame and out of frame; (7) a SONET overhead terminator configured to locate SONET frames in the electrical signal received from the optical interface and extract selected overhead bytes in the SONET frames; (8) a mapper operable to use data from the electrical signal received from the optical interface and the selected overhead bytes to generate a plurality of DS3 streams; (9) a line interface unit operable to convert the DS3 streams into respective analog signals for transmission from the at least one DS3 port, the line interface unit being operable to receive analog signals via the at least one DS3 port and convert them to corresponding digital signals, the mapper being operable to format the digital signals as a SONET stream, the SONET overhead terminator being operable to append selected overhead bytes to the SONET stream, and the SONET synchronizer being operable to prepare the SONET stream for transmission via a selected one of the first optical interface and the second optical interface and the corresponding one of the first OC3 port and the second port; and (10) a processing device operable in conjunction with the mapper, the SONET overhead terminator, the SONET synchronizer, the first optical interface and the second optical interface to perform switch protection using the first OC3 port and the second OC3 port, respectively, as one of a primary circuit and a protection circuit.

In accordance with another aspect of the present invention, the SONET synchronizer is operable to monitor respective electrical signals received via the first OC3 port and the second OC3 port for alarm conditions. The processing device is operable in response to alarm conditions indicated by the SONET synchronizer to automatically switch operation from one of the first OC3 port and the second OC3 port to the other, depending on which of the first OC3 port and the second OC3 port was operating as the primary path.

In accordance with yet another aspect of the present invention, the SONET multiplexer is operable to automatically switch between the first OC3 port and the second OC3 port for switch protection without being provisioned to do so.

In accordance with still yet another aspect of the present invention, the SONET multiplexer is deployed as a single card dimensioned for deployment in a single card slot in a shelf of a telecommunications bay. The single card is preferably implemented using Type 400 mechanics. Further, the first OC3 port and the second OC3 port are integral components of the single card.

In accordance with another aspect of the present invention, the processing device is a field programmable array device to facilitate configuration of the SONET multiplexer as a card dimensioned for deployment in a single card slot in a shelf of a telecommunications bay.

In accordance with the present invention, a method of switch protection in a SONET multiplexer is provided which comprises the steps of: (1) providing a SONET multiplexer with an integral first optical path and corresponding first OC3 port and an integral second optical path circuit and a corresponding second OC2 port; (2) operating one of the first optical path and the second optical path as a primary circuit and the other of the first optical path and the second optical path as a protection circuit; (3) monitoring signals received via the first OC3 port and the second OC3 port for alarm conditions; and (4) automatically switching operation from one of the first optical path and the second optical path to the other, depending on which of the first optical path and the second optical path was operating as the primary circuit, in response to selected alarm conditions detected via the monitoring.

In accordance with an aspect of the present invention, the monitoring step comprises the step of monitoring Automatic Protection Switching bytes in the Line Overhead of a SONET frame received via one of the first OC3 port and the second OC3 port.

In accordance with another aspect of the present invention, the monitoring step comprises the step of integrating at least one alarm generated by the SONET multiplexer in response to one of the alarm conditions to determine if it is momentary or continuous, the step of automatically switching being performed if the one of the alarm conditions is continuous.

In accordance with the present invention, a method of switch protection in a SONET multiplexer is provided wherein a first SONET multiplexer and second SONET multiplexer are provided at respective nodes. The nodes have a first fiber optic link and a second fiber optic link connected therebetween. Each of the first SONET multiplexer and second SONET multiplexer has an integral first optical path and corresponding first OC3 port connected to the first fiber optic link and an integral second optical path circuit and a corresponding second OC2 port connected to the second fiber optic link. One of the first optical path and the second optical path in each of the first SONET multiplexer and second SONET multiplexer is operated as a primary circuit, and the other of the first optical path and the second optical path in each of the first SONET multiplexer and second SONET multiplexer is operated as a protection circuit. Signals received via the first OC3 port and the second OC3 port in each of the first SONET multiplexer and second SONET multiplexer are monitored for alarm conditions. Automatically switching operation from one of the first optical path and the second optical path to the other in each of the first SONET multiplexer and second SONET multiplexer is performed, depending on which of the first optical path and the second optical path was operating as the primary circuit, in response to selected alarm conditions detected via the monitoring.

In accordance with further aspects of the present invention, the first SONET multiplexer and second SONET multiplexer are each deployed as a single card dimensioned for deployment in a single card slot in a shelf of a telecommunications bay. The single cards preferably employ Type 400 mechanics.

BRIEF DESCRIPTION OF THE DRAWINGS

These and other objects, advantages and novel features of the present invention will be readily appreciated from the following detailed description when read in conjunction with the accompanying drawings, in which:

FIGS. 11A, 11B and 11C are block diagrams of hardware components, including a field programmable gate array (FPGA), for an O3-3D3 multiplexer constructed in accordance with an embodiment of the present invention;

Throughout the drawing figures, like reference numerals will be understood to refer to like parts and components.

DETAILED DESCRIPTION OF THE PREFERRED EMBODIMENTS

In accordance with an embodiment of the present invention, a SONET multiplexer 50 that provides OC3 to DS3 multiplexing and has a form factor that is substantially reduced with respect to existing multiple shelf and/or multiple card units is shown in FIGS. 3A, 3B, 3C and 4. The multiplexer (MUX) 50 of the present invention shall hereinafter be referred to as an O3-3D3 MUX 50.

Figure 3A:
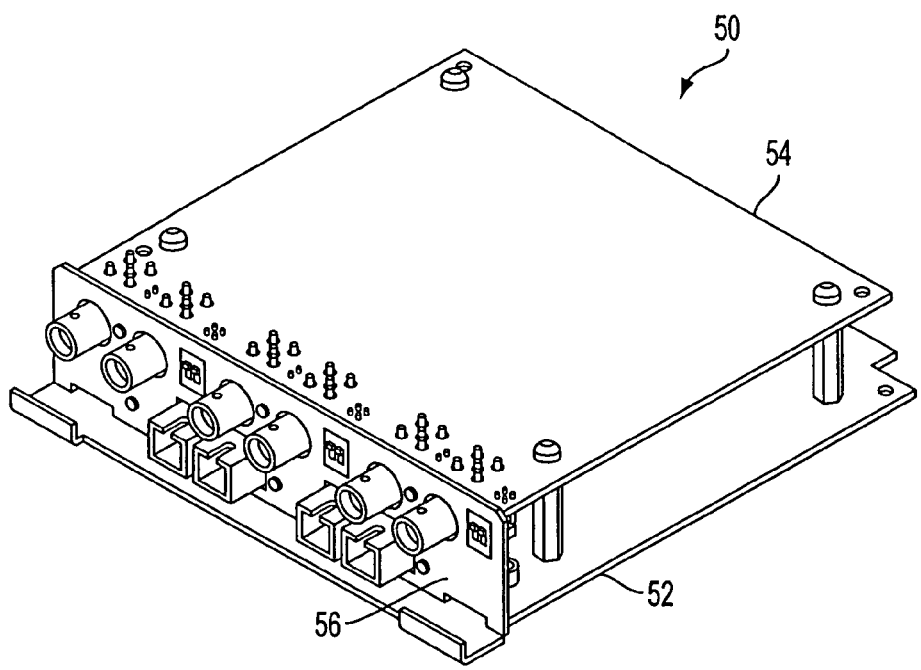
FIG. 3A is a perspective view of an O3-3D3 multiplexer comprising a face plate, a main board and an upper board and constructed in accordance with an embodiment of the Present invention.
Figure 3C:
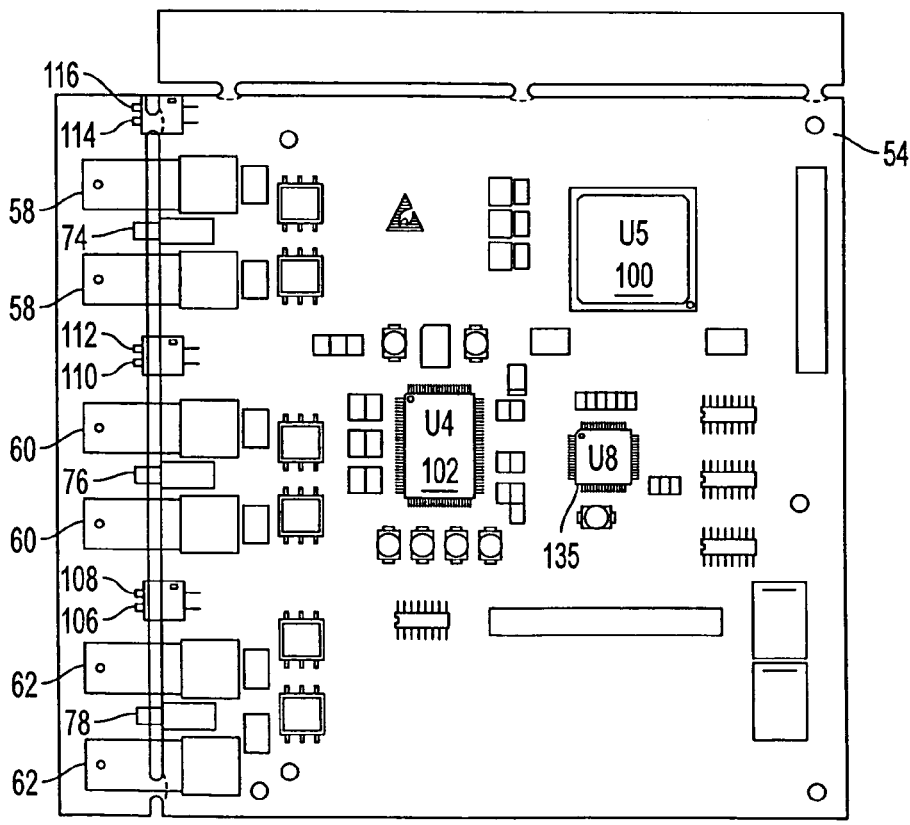
FIG. 3C is a top component view of the upper board of the O3-3D3 multiplexer depicted in FIG. 3A.
Figure 3B:
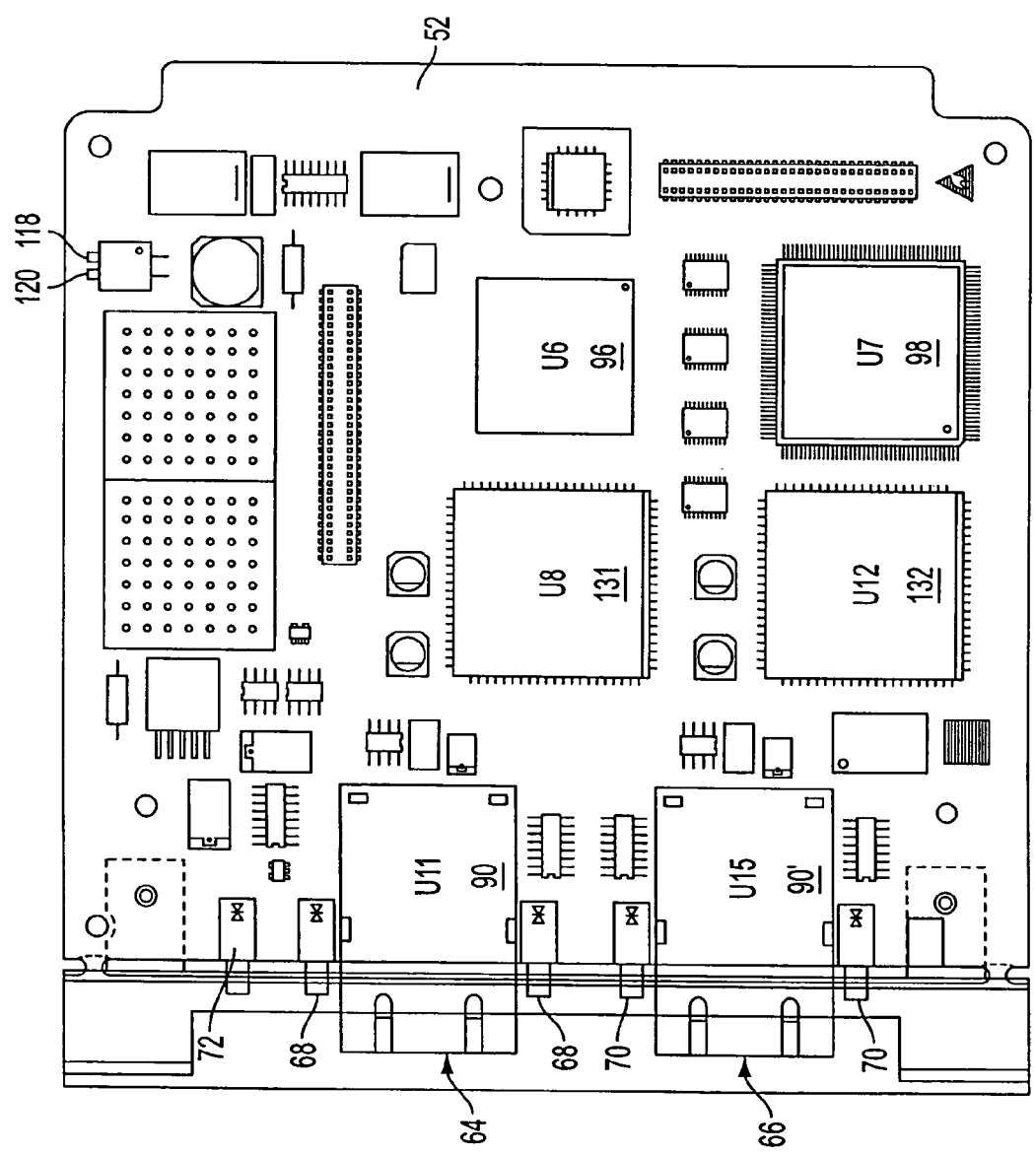
FIG. 3B is a top component view of the main board of the O3-3D3 multiplexer depicted in FIG. 3A.
Figure 4:
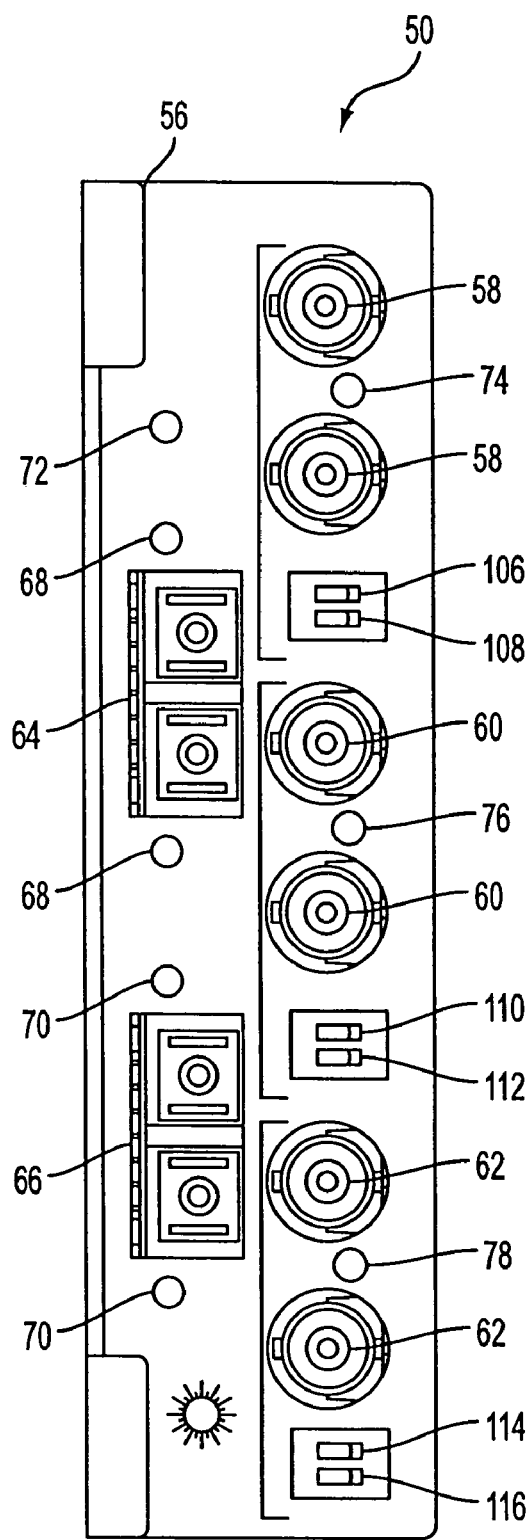
FIG. 4 is a front view of the face plate of the O3-3D3 depicted in FIG. 3A.

The O3-3D3 MUX 50 is designed to derive three DS3 circuits from an OC3 synchronous optical network (SONET) 1550 nm or 1310 nm optical facility. As shown in FIGS. 3A, 3B and 3C, the O3-3D3 MUX 50 is configured as a card that can be inserted in a telecommunications equipment bay and requires only a single card slot due to its standard Type 400 mechanics circuit board arrangement. A front view of the face plate 56, including connectors, indicators (e.g., LEDs) and switches, is provided in FIG. 4 and described in more detail below. The face plate 56 in FIG. 4 is mounted to two circuit boards 52 and 54, as shown in FIG. 3A. The main or lower circuit board 52 shown in FIG. 3B comprises a field programmable gate array (FPGA) U16 indicated at 96, two SONET synchronizers U8 and U12 indicated at 131 and 132, respectively, a SONET overhead terminator U7 indicated at 98, switches 118 and 120 described below in connection with FIG. 8, an optical transceiver U11 indicated at 90 for optical port 64, and an optical transceiver U15 indicated at 90' for optional optical port 64. The main or lower circuit board 52 also comprises LEDs 68, 70 and 72 described below in connection with FIG. 4. The upper board 54 shown in FIG. 3C comprises a mapper U5 indicated at 100, a Triple DS3 Line Interface Unit U4 indicated at 102, a DS3 jitter attenuator U8 indicated at 135, and the DS3 ports 58, 60 and 62. The upper board 54 also comprises LEDs 74, 76 and 78 and switches 106, 108, 110, 112, 114 and 116 described below in connection with FIG. 4. Additional components such as heat sinks, the connector between the boards 52 and 54, the MUX 50 card connector, and other circuits that support the operation of the boards 52 and 54 are provided on the boards 52 and 54. The mechanical aspects of the O3-3D3 MUX 50 are described in more detail in the above-mentioned corresponding application Serial Nos. filed concurrently herewith.

With reference to FIG. 4, the O3-3D3 MUX 50 is provided with a number of advantageous features such as three DS3 ports 58, 60 and 62, one OC3 port 64, and an optional second OC3 port 66 for fiber protection switching. The O3-3D3 MUX 50 has standard DS3 75-ohm BNC connections for the DS3 ports 58, 60 and 62 and standard fiber SC interface connectors for the OC3 ports 64 and 66.

The O3-3D3 MUX 50 is configured with a drop-and-continue ring capability with or without protection switching that is substantially easier to use and less costly than existing multiplexers such as those described above. Whereas existing multi-shelf and/or multi-card multiplexers require substantial configuration and provisioning to achieve merely an operable data path, the O3-3D3 MUX 50 provides exceptionally simple plug-and-play installation and use in various applications, as will be described in further detail below. The O3-3D3 MUX 50 uses standard Type 400 mechanics to permit installation in inexpensive wall, shelf, or self-contained housings within central office (CO), digital loop carrier (DLC), or remote terminal (RT) facilities or customer-premises equipment (CPE). The O3-3D3 MUX is also climate-hardened for unrestricted deployment in outside plant (OSP) cabinets.

The O3-3D3 MUX 50 is provided with 1310 nm or 1550 nm optics that can be used with Wave Division Multiplexing (WDM) couplers (e.g., such as those described in the afore-mentioned, co-pending application Serial Nos). The O3-3D3 MUX 50 has either medium-range optics to economically support fiber facilities of up to 40 kilometers, or long-range optics to support extended range (ER) applications up to 80 kilometers, as described below.

The O3-3D3 MUX 50 employs comprehensive and continuous monitoring of the optical signals for local and remote loss of frame, loss of signal, out of frame, loss of pattern, loss of pointer, optical degradation, blown fuse, unit failure, and loss of power with universal contact closure alarm reporting. The O3-3D3 MUX is also provided with a remote alarm indication signal and loopback capability for comprehensive network and maintenance monitoring. The front panel 56 of the O3-3D3 MUX 50 is provided OC3 status LEDs 68 and 70, DS3 status LEDs 74, 76 and 78 and a UNIT status LED 72. The O3-3D3 MUX 50 also allows fiber-to-fiber operation with traditional OC3 SONET multiplexers.

Figure 5:
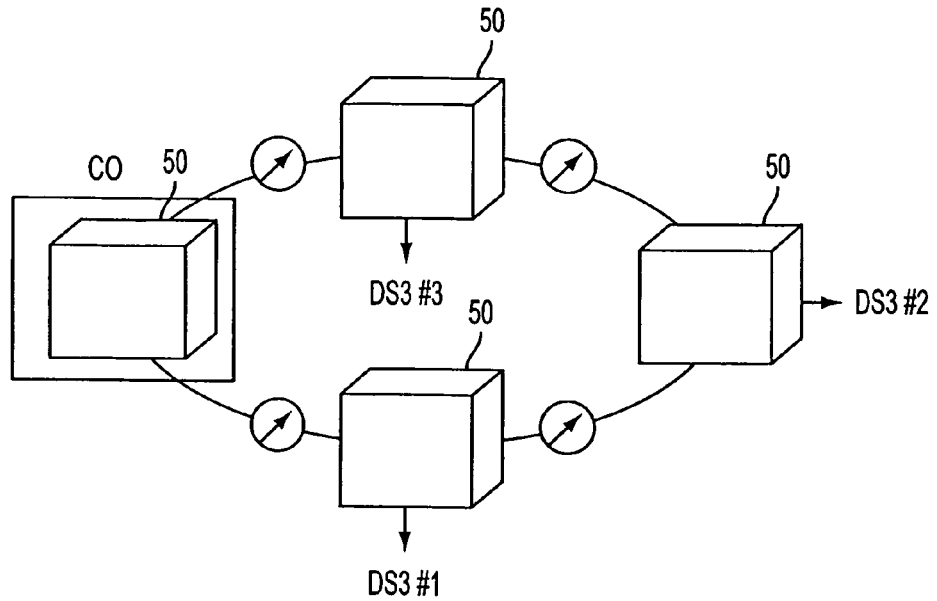
FIG. 5 is a block diagram of a plurality of O3-3D3 multiplexers connected in a drop and continue ring application in accordance with an embodiment of the present invention.
Figure 6:
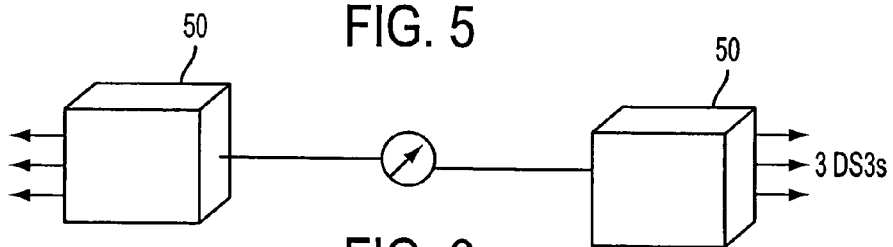
FIG. 6 is a block diagram of a plurality of O3-3D3 multiplexers connected in a point-to-point application in accordance with an embodiment of the present invention.
Figure 7:
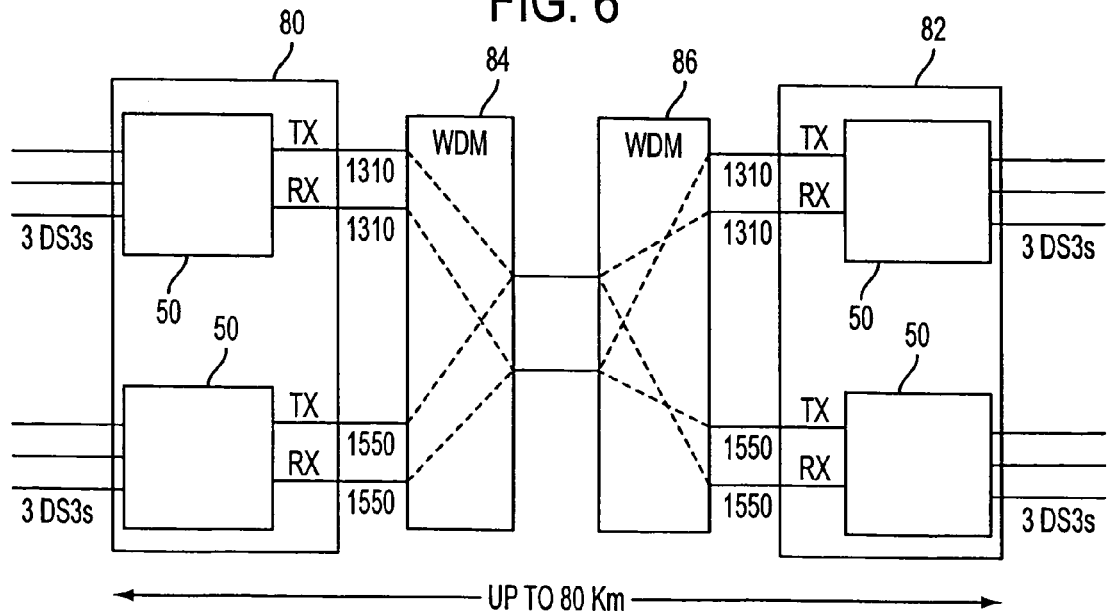
FIG. 7 is a block diagram of a plurality of O3-3D3 multiplexers connected in an application that provides six DS3s over two optical fibers using WDM couplers in accordance with an embodiment of the present invention.

As stated previously, the O3-3D3 MUX 50 provides exceptionally simple plug-and-play installation and use in various applications. FIGS. 5, 6 and 7 illustrate, respectively, three exemplary O3-3D3 applications. FIG. 5 illustrates a drop-and-continue ring. FIG. 6 depicts a point-to-point application. FIG. 7 illustrates transport of six DS3s over two fibers using a pair of O3-3D3s MUX 50 mounted in a 1.75" high, 19" or 23" wide rack assembly 80, 82, and WDM couplers 84 and 86. As described in the afore-mentioned, co-pending application Serial Nos., the WDMs 84 and 86 also employ Type 400 mechanics and can be mounted in a compact enclosure along with the O3-3D3 MUX 50 or other card combinations.

Figure 9:
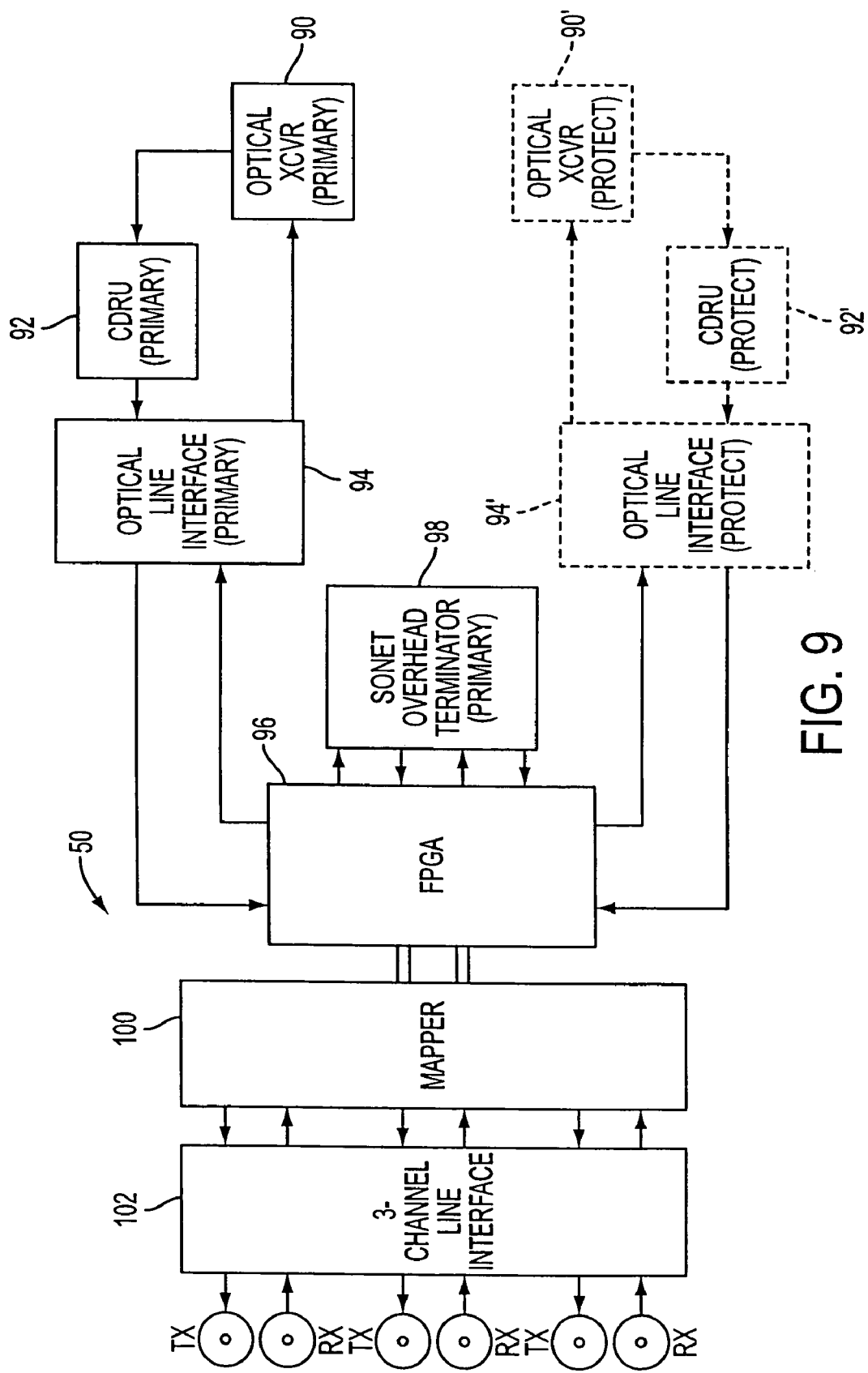
FIG. 9 is a block diagram of an O3-3D3 multiplexer constructed in accordance with an embodiment of the present invention.

A functional description of the O3-3D3 MUX 50 will now be provided with reference to FIG. 9. The components in FIG. 9 will first be described, followed by a more detailed discussion of the processing performed in the receive path and the transmit path. The components in FIG. 9 are all provided on one of the boards 52 and 54 of the single-card slot configuration of the O3-3D3 MUX 50 described above in connection with FIGS. 3A through 3C.

With reference to FIG. 9, an optical signal is converted to an electrical format by an optical transceiver 90. A clock data recovery unit (CDRU) 92 is operable to obtain the receive clock frequency and receive path optical rate to separate the clock and data and provide the data to an optical line interface unit (LIU) 94.

The output of the transceiver 90 must be processed to determine the boundaries between each bit. This processing is performed by a SONET synchronizer 131 on the lower main board 52 of the OC3-3DS2 MUX 50 depicted in FIGS. 3A-C. The data is accepted by a SONET overhead terminator 98 which finds the start of each 125 microsecond frame and extracts certain bytes called overhead. Overhead is data in the SONET stream which is not the customer's data. It is additional data used to perform administrative functions such as switch to protect operations. The SONET overhead terminator 98 uses a pointer mechanism to locate the bytes within the SONET stream which are customer data.

As stated above, the SONET MUX 50 of the present invention can be provided with an optional second OC3 port 66 which can be used to provide protection switching. The optical transceiver 90', CDRU 92', and optical line interface unit 94' that support the second OC3 port 66 are indicated in FIG. 9 in phantom lines. These devices operate with respect to the second OC3 feed 66 in the same manner as stated above in connection with the primary optical transceiver 90, CDRU 92, and optical line interface unit 94 and the primary OC3 feed 64.

Figures 1, 11B:
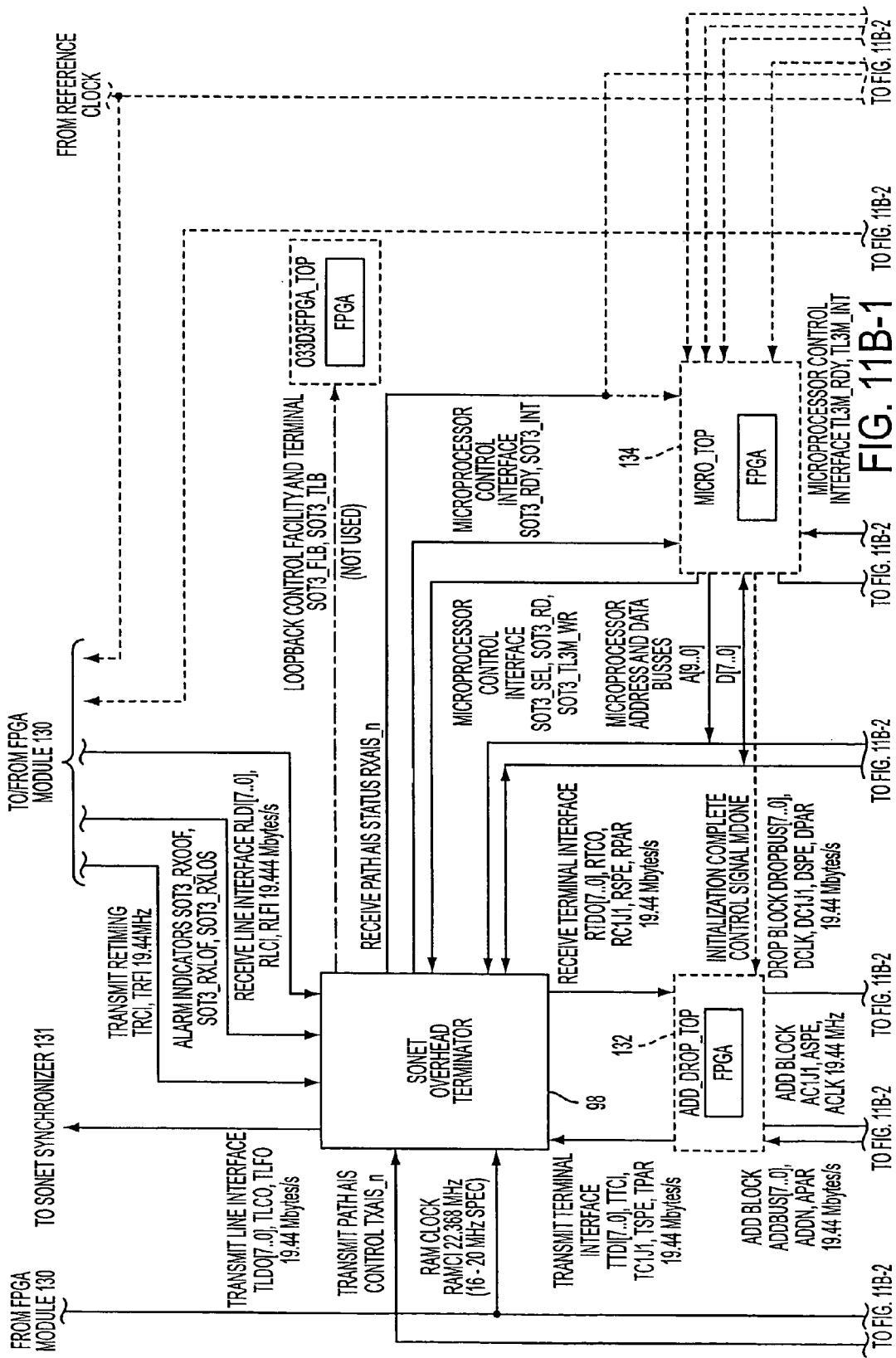

The pointer and the customer data are handed to a mapper 100 where it is divided into three DS3 streams. If the output data from the mapper 100 contains jitter, that is, the data was presented at slightly irregular time intervals, the jitter attenuator as illustrated in FIG. 11B corrects the problem. The triple DS3 LIU 102 converts three streams of digital data into three standard analog interfaces.

Each component in FIG. 9 is bi-directional. The DS3 LIU 102 accepts three analog signals and converts them to digital format. The mapper 100 accepts the three digital streams and converts them to a single digital stream in the SONET format. The SONET overhead terminator 98 appends the overhead data to the data received from the mapper 100. Each SONET synchronizer 131, 132 (FIG. 11A) provides the appropriate drive to the corresponding optical transceivers 90, 90' (FIG. 9).

With reference to the receive path, optical data is received at the OC3 transceiver 90 as either a 1310 nm or a 1550 nm wave-length. The optical signal is converted to an electrical differential signal. A clock and serial data are recovered. The recovered clock is phase-aligned with recovered serial data.

Optical signal synchronization is established when the Framer has located and locked on to the Synchronous Transport Signal-3 (STS-3) framing pattern. Should there be a loss of frame synchronization, a user alarm is generated.

The recovered data contains payload, as well as Section, Line, and Path Overhead (POH). The Section and Line Overhead are collectively considered Transport Overhead (TOH). TOH processing takes place by the processing of the B2 byte, Bit Interleaved Parity-8 (BIP-8), and Line Far-End Block Error (FEBE). Finally, a detection of Line Remote Defect Indication (RDI) and Line Alarm Indication Signal (AIS) is performed.

Pointer tracking is performed by analyzing the H1/H2 bytes to determine the location of the JI POH byte. Loss Of Pointer (LOP) and AIS alarms are provided for the STS-1 signal. The B3 BIP-8 is checked for parity, and the number of bit or block errors is counted. The G1 byte is checked, and RDI status and the number of FEBEs are counted. All Section and Line Overhead bytes are processed at this time.

The DS3 data is extracted and passed into a resynchronization module on the FPGA 96, where it uses a Phase-Locked Loop (PLL) to transmit data into synchronous DS3 formats. A reference clock is used to remove systematic jitter, and Bipolar 3-Zero Substitution (B3ZS) encoding takes place.

The transmit path receives incoming DS3 data, reformats it into an STS-1, and presents it to the optical interface circuitry. All overhead is processed in this path as well.

B3ZS-encoded data is received and reformatted into a serial bit stream. The serial data is passed to a PLL to recover clock. The B3ZS signal is decoded, and coding violations are detected.

The DS3 signal is converted to parallel data and mapped into an STS-1 format. POH bytes are appended to the frame. FEBE and Path RDI can be inserted, depending upon the status of local alarms.

Data is clocked into an expansion buffer to decouple the data. Data is reclocked by a 155 MHz clock and presented as a differential signal to the OC3 transceiver 90.

The OC3 transceiver 90 receives differential clock and data, and converts it to a 1310 nm or a 1550 nm optical signal. Data and clock are combined and transmitted at an OC3 rate.

Figure 10:
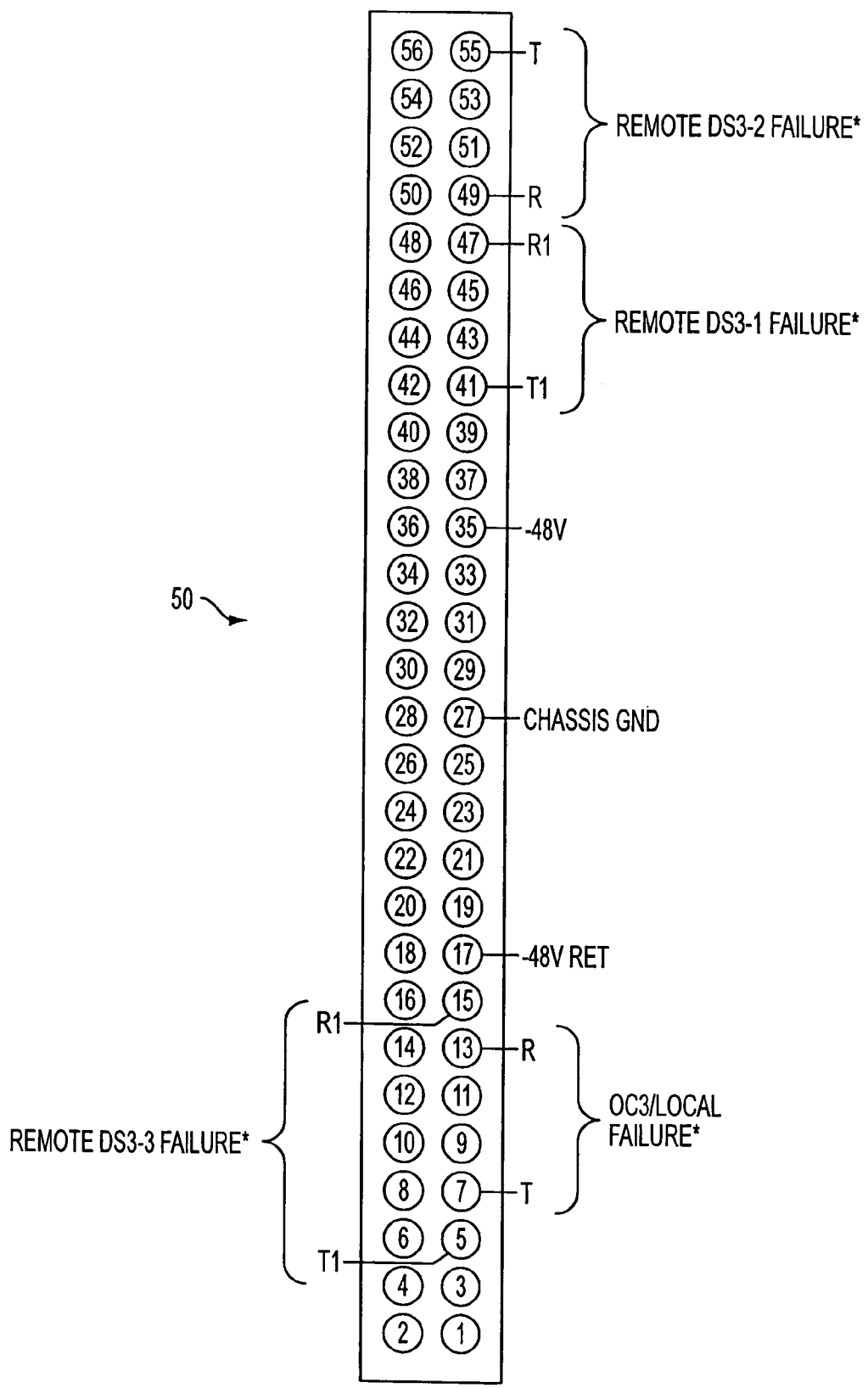
FIG. 10 is a front view of an O3-3D3 multiplexer backplane connector constructed in accordance with an embodiment of the present invention.

Tables 2 and 3 provide $OC_3$-3D3 MUX 50 alarm contact information. Standard network channel terminating equipment (NCTE) pin-outs are used, as illustrated in FIG. 10. The use of NCTE conventions permits generic mountings to accommodate a multitude of different plug-ins.

TABLE 2

O3-3D3 Alarm Contact Definitions

| Alarm Condition | Resulting Alarm Contact Closure |
|---|---|
| OC3 or Local Failure | Contact closure between NCTE network T & R (pins 7 and 13) |
| Remote DS3-1 Failure | Contact closure between NCTE network T1 & R1 (pins 41 and 47) |
| Remote DS3-2 Failure | Contact closure between NCTE subscriber T & R (pins 55 and 49) |
| Remote DS3-3 Failure | Contact closure between NCTE subscriber T1 & R1 (pins 5 and 15) |

TABLE 3

O3-3D3 Alarm Contact and Signal Insertion Mix

| Local Failure | | | | | Local O3-3D3 Alarm Indication | | | | Remote O3-3D3 Indication | | | |
|---|---|---|---|---|---|---|---|---|---|---|---|---|
| OC3 | DS3-1 | DS3-2 | DS3-3 | Power | OC3/ Local | DS3-1 | DS3-2 | DS3-3 | OC3/ Local | DS3-1 | DS3-2 | DS3-3 |
| — | — | — | — | — | — | — | — | — | — | — | — | — |
| X | — | — | — | — | X | — | — | — | X | — | — | — |
| — | X | — | — | — | X | — | — | — | — | X | — | — |
| — | — | X | — | — | X | — | — | — | — | — | X | — |
| — | — | — | X | — | X | — | — | — | — | — | — | X |
| — | — | — | — | X | X | X | X | X | X | — | — | — |

NOTE:
X = relay closed;
— = relay open.

The front panel of the O3-3D3 MUX 3 has switches, indicators, and connectors, as described above in connection with FIG. 4 and described in more detail below in Table 4.

TABLE 4

O3-3D3 Front-Panel Switches, Indicators, and Connectors

| Switch | Feature | Position | Function |
|---|---|---|---|
| DS3 1 | LBO | L | Provisions DS3 #1 for coaxial cable loop lengths of greater than or equal to 100 feet. |
| | | S | Provisions DS3 #1 for coaxial cable loop lengths of less than or equal to 100 feet. |
| | CONTINUE | Y | In drop-and-continue ring applications, configures O3-3D3 to continue DS3 #1 to "downstream" O3-3D3s. In point-to-point applications, disables local DS3 #1 alarms. |
| | | N | In drop-and-continue ring applications, configures O3-3D3 to locally drop DS3 #1 and activate the local DS3 #1 BNC connectors. In point-to-point applications, enables local DS3 #1 operation and activates local DS3 #1 alarms. |
| DS3 2 | LBO | L | Provisions DS3 #2 for coaxial cable loop lengths of greater than or equal to 100 feet. |
| | | S | Provisions DS3 #2 for coaxial cable loop lengths of less than or equal to 100 feet. |
| | CONTINUE | Y | In drop-and-continue ring applications, configures O3-3D3 to continue DS3 #2 to "downstream" O3-3D3s. In point-to-point applications, disables local DS3 #2 alarms. |
| | | N | In drop-and-continue ring applications, configures O3-3D3 to locally drop DS3 #2 and activate the local DS3 #2 BNC connectors. In point-to-point applications, enables local DS3 #2 operation and activates local DS3 #2 alarms. |
| DS3 3 | LBO | L | Provisions DS3 #3 for coaxial cable loop lengths of greater than or equal to 100 feet. |
| | | S | Provisions DS3 #3 for coaxial cable loop lengths of greater than or equal to 100 feet. |
| | CONTINUE | Y | In drop-and-continue ring applications, configures O3-3D3 to continue DS3 #3 to "downstream" O3-3D3s. In point-to-point applications, disables local DS3 #3 alarms. |
| | | N | In drop-and-continue ring applications, configures O3-3D3 to locally drop DS3 #3 and activate the local DS3 #3 BNC connectors. In point-to-point applications, enables local DS3 #3 operation and activates local DS3 #3 alarms. |

| Indicator | Function |
|---|---|
| UNIT | Lights green to show normal unit operation. Lights red to show a unit failure. |
| OC3 PRI | Lights green to show normal operation of the primary OC3 link. Lights red to show a failure of the primary OC3 link. Lights amber to show an OC3 failure has been detected at a remote location. |

TABLE 4-continued

O3-3D3 Front-Panel Switches, Indicators, and Connectors

| | |
|---|---|
| ACTIVE (OC3 PRI) | Lights green to show the primary OC3 link is carrying the traffic payload in "P" versions equipped with integral fiber switch-to-protect. Turns OFF to show the primary OC3 link is not carrying the traffic payload in "P" versions equipped with integral fiber switch-to-protect. |
| OC3 SEC | Lights green to show normal operation of the secondary OC3 link in "P" versions equipped with integral fiber switch-to-protect. Lights red to show a failure of the secondary OC3 link in "P" versions equipped with integral fiber switch-to-protect. Lights amber to show an OC3 failure has been detected at a remote location. |
| ACTIVE (OC3 SEC) | Lights green to show the secondary OC3 link is carrying the traffic payload in "P" versions equipped with integral fiber switch-to-protect. Turns OFF to show the secondary OC3 link is not carrying the traffic payload in "P" versions equipped with integral fiber switch-to-protect. |
| DS3 1 | Lights green to show normal operation of DS3 #1; flashes green to show loopback. Lights amber to show a far-end trouble; remains amber during additional near-end failure until far-end failure clears. Turns OFF to show the local DS3 port is not active because it is in CONTINUE mode. Lights red to show a failure of DS3 #1. |
| DS3 2 | Lights green to show normal operation of DS3 #2; flashes green to show loopback. Lights amber to show a far-end trouble; remains amber during additional near-end failure until far-end failure clears. Turns OFF to show the local DS3 port is not active because it is in CONTINUE mode. Lights red to show a failure of DS3 #2. |
| DS3 3 | Lights green to show normal operation of DS3 #3; flashes green to show loopback. Lights amber to show a far-end trouble; remains amber during additional near-end failure until far-end failure clears. Turns OFF to show the local DS3 port is not active because it is in CONTINUE mode. Lights red to show a failure of DS3 #3. |

| Connector | Type | Function |
|---|---|---|
| OC3 PRI IN | Duplex SC | Primary OC3 input. |
| OC3 PRI OUT | Duplex SC | Primary OC3 output. |
| OC3 SEC IN | Duplex SC | Secondary switch-to-protect OC3 input for "P" version units. |
| OC3 SEC OUT | Duplex SC | Secondary switch-to-protect OC3 output for "P" version units. |
| DS3 1 IN | 75 BNC | DS3 #1 input. |
| DS3 1 OUT | 75 BNC | DS3 #1 output. |
| DS3 2 IN | 75 BNC | DS3 #2 input. |
| DS3 2 OUT | 75 BNC | DS3 #2 output. |
| DS3 3 IN | 75 BNC | DS3 #3 input. |
| DS3 3 OUT | 75 BNC | DS3 #3 output. |

The O3-3D3 MUX 50 is preprovisioned for an established network and emerging DS3 applications to simplify set up and provisioning for its use in a particular application. More specifically, the SONET multiplexer 50 also has a limited set of switches (e.g., six on the front access panel 56 and two on the inside board 52). Remaining parameters are predetermined and set up as defaults and require no provisioning on the part of the user.

As shown in FIG. 4, the six switches 106, 108, 110, 112, 114 and 116 correspond to two types of switches allowing user selection of two respective parameters for each of three DS3 ports 58, 60 and 62 to the SONET multiplexer 50. The two types of switches allow the user to select, respectively, the line build out parameter (i.e., long or short) and continue parameter (i.e., yes for continue/drop if the DS3 is to be sent out via an OC3 port, or no if the DS3 is to be dropped and sent out as a DS3) for the corresponding DS3 port.

Figure 8:
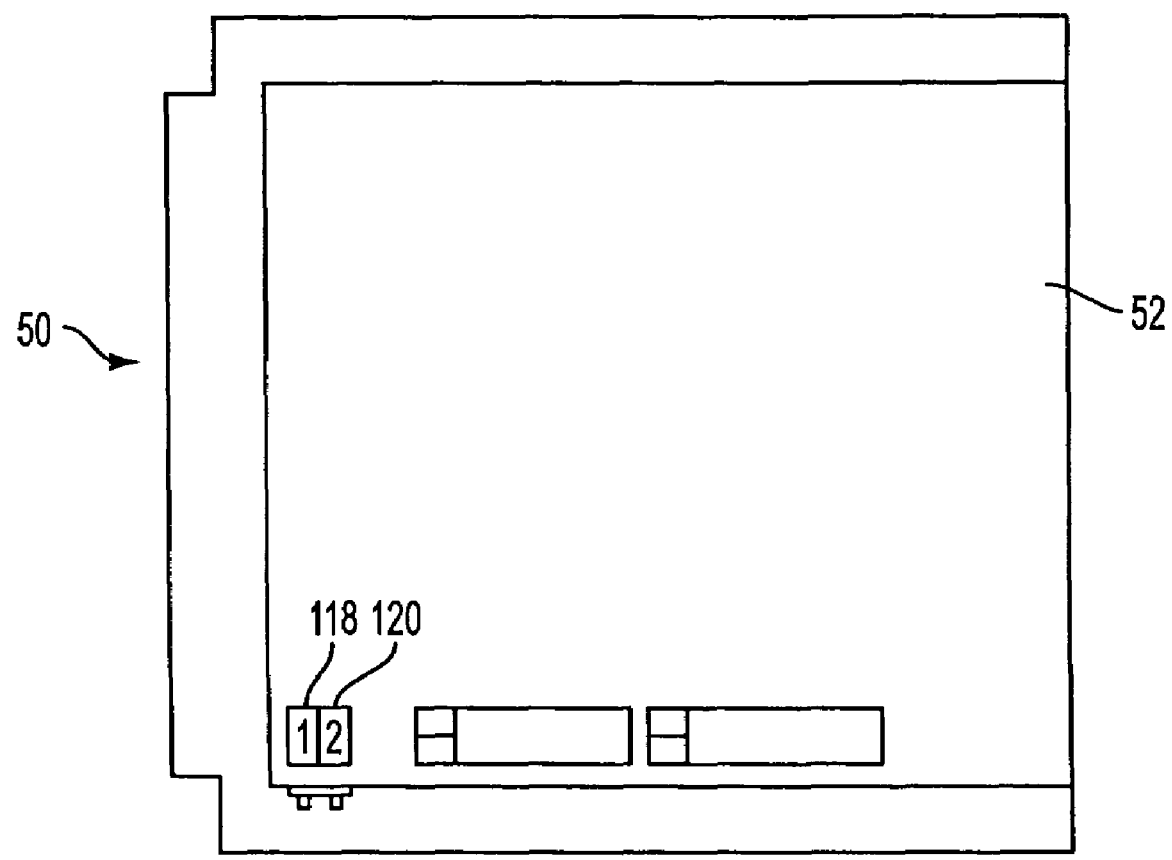
FIG. 8 is a partial top view of the main board in the O3-3D3 multiplexer depicted in FIG. 3C having switches for loopback options.

As shown in FIG. 8, switch S1-1 118 on the lower printed circuit board 52 (PCB) selects either 60-minute loopback timeout (i.e., EN (enable) position) or no loopback timeout (i.e., DIS (disable) position). Switch S1-2 120 selects whether the unit will respond to either the standard DS3 LINE loopback code (from GR-499-CORE) or a network interface unit (NIU) loopback code (0001001011111111=loop up and 0010010011111111=loop down). In accordance with an aspect of the present invention, the NIU loopback can provide a different O3-3D3 loopback capability when the unit is connected to another device that uses the standard far-end alarm and control (FEAC) loopback code.

The continue/drop selection for each DS3 port 58, 60 and 62 via a simple switch position selection via its corresponding switch 106, 110 and 114 represents a significant advantage over existing SONET multiplexers. The drop application is illustrated in FIG. 6, and the drop and continue ring application is illustrated in FIG. 5. Each of the four O3-3D3 SONET multiplexers of the present invention used in this application need only have the ring respective CONTINUE switches switched to the Y position (i.e., yes) to enable the data paths needed for this application. By contrast, if four Fujitsu Multiplexers 10 were to be deployed in such a ring configuration, each Fujitsu Multiplexer 10 would require substantial provisioning to instruct the unit regarding which data paths are being used, as well as alarm conditions, among other configuration data.

The advantages of the SONET multiplexer 50 of the present invention over existing systems such as the Fujitsu Multiplexer 10 is also illustrated when only a subset of the ports are used. For example, if only two of the three DS3 ports of the SONET multiplexer are employed in an application, the CONTINUE switches indicate which of the three ports is not being used, thereby eliminating the need for an alarm. By contrast, if only two ports of the Fujitsu Multiplexer 10 are used, the unit must be provisioned to tell it how to cross-connect DS3s at each point of an application such as the ring configuration (FIG. 5). As stated previously, each data path must be completely configured, otherwise, the Fujitsu Multiplexer 10 will not operate. The SONET multiplexer 50 of the present invention has preconfigured data paths and operates upon mere power up, in addition to the paths being simply reconfigurable via the switches 106, 110 and 114. Further, a node created through provisioning of a Fujitsu Multiplexer 10 can be completely torn down or rendered inoperable by an incorrect key stroke on the computer running the provisioning application during the provisioning process. The SONET multiplexer 50 of the preset invention, on the other hand, eliminates the need for any such computer, as well as the associated risk than an incorrect keystroke would disrupt operation.

The SONET multiplexer 50 of the preset invention simplifies provisioning a number of ways such as by basing system timing and synchronization on an internally generated clock (i.e., a DS3-based clock imbedded in SONET), as opposed to making system timing a provisionable parameter as in existing systems (e.g., which provide a user with choices such as SONET and global positioning system (GPS) timing). In addition, the SONET multiplexer 50 of the preset invention provides users with one predetermined interface (i.e., OC3 to DS3) and therefore does not require T1 provisioning or provisioning as to connections with DS1, DS2, OC12, among others, as do existing SONET multiplexers. The SONET multiplexer 50 is configured as a single card and therefore does not require equipment provisioning (e.g., for multiple cards) as do existing SONET multiplexers. Since the SONET multiplexer 50 provides simple switches, no security provisioning is needed to prevent unauthorized remote access, unlike existing SONET multiplexers requiring a user interface via a computer and therefore possibly using passwords or other security measures.

Another advantage of the SONET multiplexer 50 of the present invention is its ability to provide a loopback for maintenance. The SONET multiplexer 50 is configured to have a loopback time out and predetermined codes to allow transmission of a data stream (e.g., comprising one of the codes) to a distant unit and reception of returned data to ensure that the signal path is good. The afore-mentioned switches 106, 108, 110, 112, 114 and 116 do not affect the data paths in the multiplexer 50, as stated above, nor this loopback operation, in contrast with provisioning operations for existing equipment such as the Fujitsu Multiplexer 10. The aforementioned inband loopback codes allow a customized response (e.g., selection of one of the two codes) to allow a user deeper penetration during equipment testing and to ensure that a selected piece of equipment is being tested.

As stated above, existing SONET multiplex equipment generally requires at least one equipment shelf with multiple cards, or at least, multiple cards to achieve such functions as data path control, alarms, switch protection, synchronization, and monitoring operations, among other functions. The Fujitsu Multiplexer 10 uses several cards to provide OC3 to DS3 to DS1 multiplexing. The existing form factors (e.g., equipment shelves for bay installation and cards for use in bay shelves) are largely due to the development of SONET multiplex equipment using components such as microprocessors and other integrated circuits that are interfaced via microprocessor and corresponding software to interoperate these components.

In accordance with an aspect of the present invention, a SONET multiplexer 50 is provided to perform OC3 to DS3 multiplexing and demultiplexing operations using a substantially reduced form factor as compared with existing SONET equipment that can perform the same multiplexing functions. The SONET multiplexer 50 of the present invention is implemented as a single card (i.e., capable of deployment on a single card slot in a telecommunications bay equipment shelf). As described above in connection with FIGS. 3A, 3B, 3C and 4, the card 50 comprises a face plate 56 and two attached circuit boards 52 and 54 referred to as the main board 52 and the lower board 54. The main board 52 comprises a field programmable gate array (FPGA), the operations of which are described below in connection with a hardware block diagram depicted in FIG. 11. Thus, the SONET multiplexer 50 of the present invention is considerably smaller than existing SONET multiplexers having the same functionality, which consist of multiple plug-in cards. While single-card media converters are available to perform optical and electrical signal conversions, they are not able to conform to the GR-499 and GR-253 standards as does the SONET multiplexer 50 of the present invention.

The reduced form factor of the SONET multiplexer 50 therefore overcomes many of the disadvantages of existing multi-card SONET multiplexers since it does not require much equipment space. Further, the SONET multiplexer 50 of the present invention can be deployed as a standalone component and therefore need not be inserted into a bay shelf at all, but instead can be mounted on the side of a bay, on a wall in the equipment area of the CO, RT or other user, on a top of a computer, table or other work surface, among other places.

With continued reference to FIG. 4, the SONET multiplexer 50 of the present invention allows front panel 56 accesses to three DS3 ports 58, 60 and 62, as well as the OC3 port 64. The single card implementation of the SONET multiplexer 50 facilitates its use with other cards such as a wave division multiplexer (WDM) and a DS3 to DS1 multiplexer (M13), which are described in the afore-mentioned application Serial Nos., both filed concurrently herewith. By way of an example, the O3-3D3 MUX 50 can be used within a high rise building receiving an OC-12 feeder. The O3-3D3 MUX 50 can be used to drop DS3s to different floors. The M13 can also be used to drop DS1s to different floors. The configuration of the O3-3D3, the M13 and the WDM as single-card building components allows different arrangements of these cards in a small profile chassis or enclosure that is independent of equipment shelves for flexible installations, as described in the afore-mentioned application Serial Nos. Further, unlike existing SONET equipment, the chassis does not have dedicated card slots.

Figure 2:
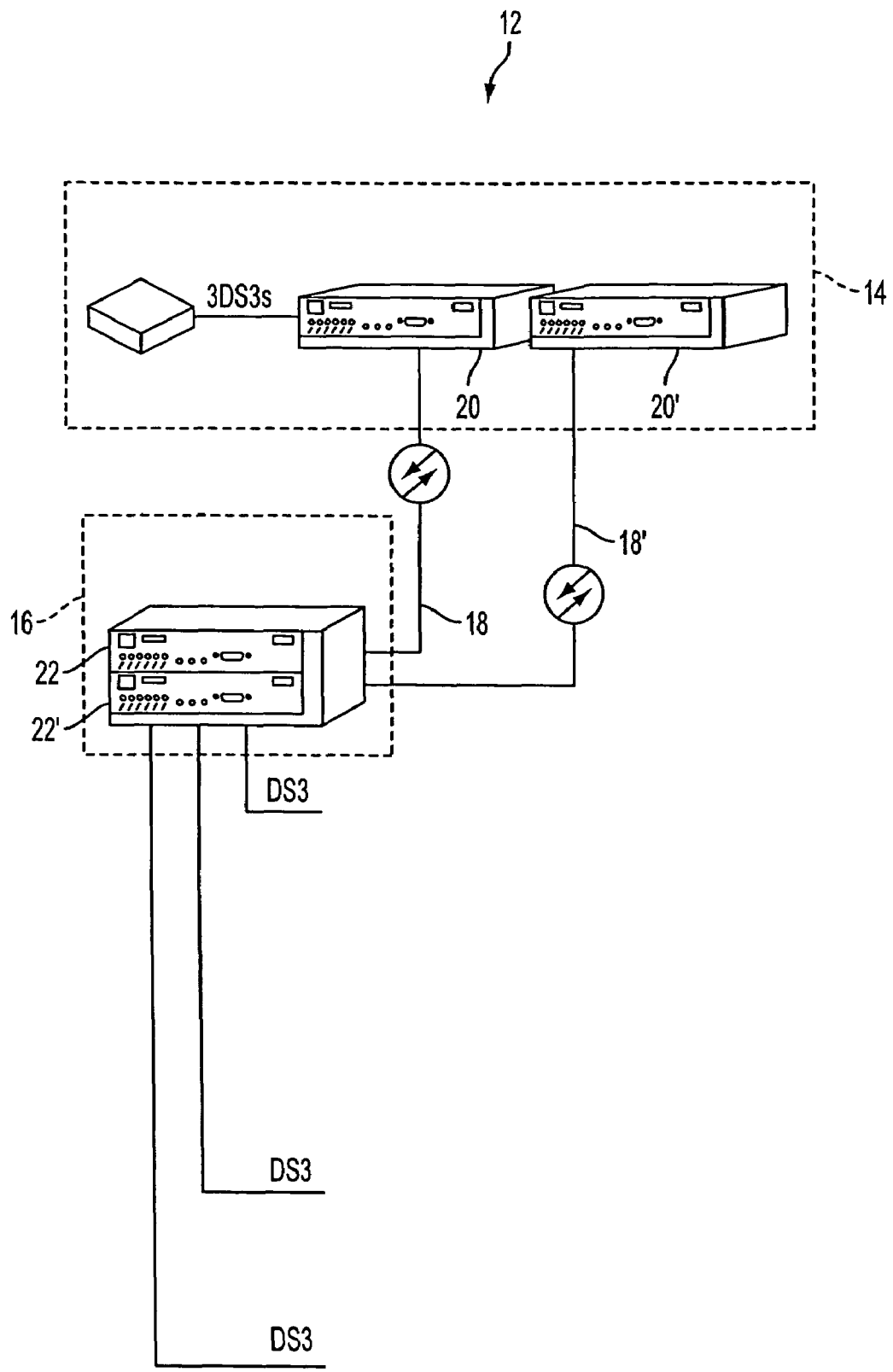
FIG. 2 depicts conventional SONET multiplexers configured for optical redundancy.

The reduced form factor and FPGA also provide for integral switch protection. As will be described in further detail below, the SONET MUX 50 of the present invention provides a protection switching using only a single circuit, that is, the O3-3D3 card 50 configuration as shown in FIG. 3A. By contrast, existing SONET multiplex equipment requires two separate circuit packs at each node, as illustrated in FIG. 2. As discussed above in connection with the Adtran unit 20, this dual circuit configuration of existing equipment is disadvantageous because it doubles the cost and power consumption, consumes more equipment space, and is more likely to be subject to equipment failure.

Figure 1:
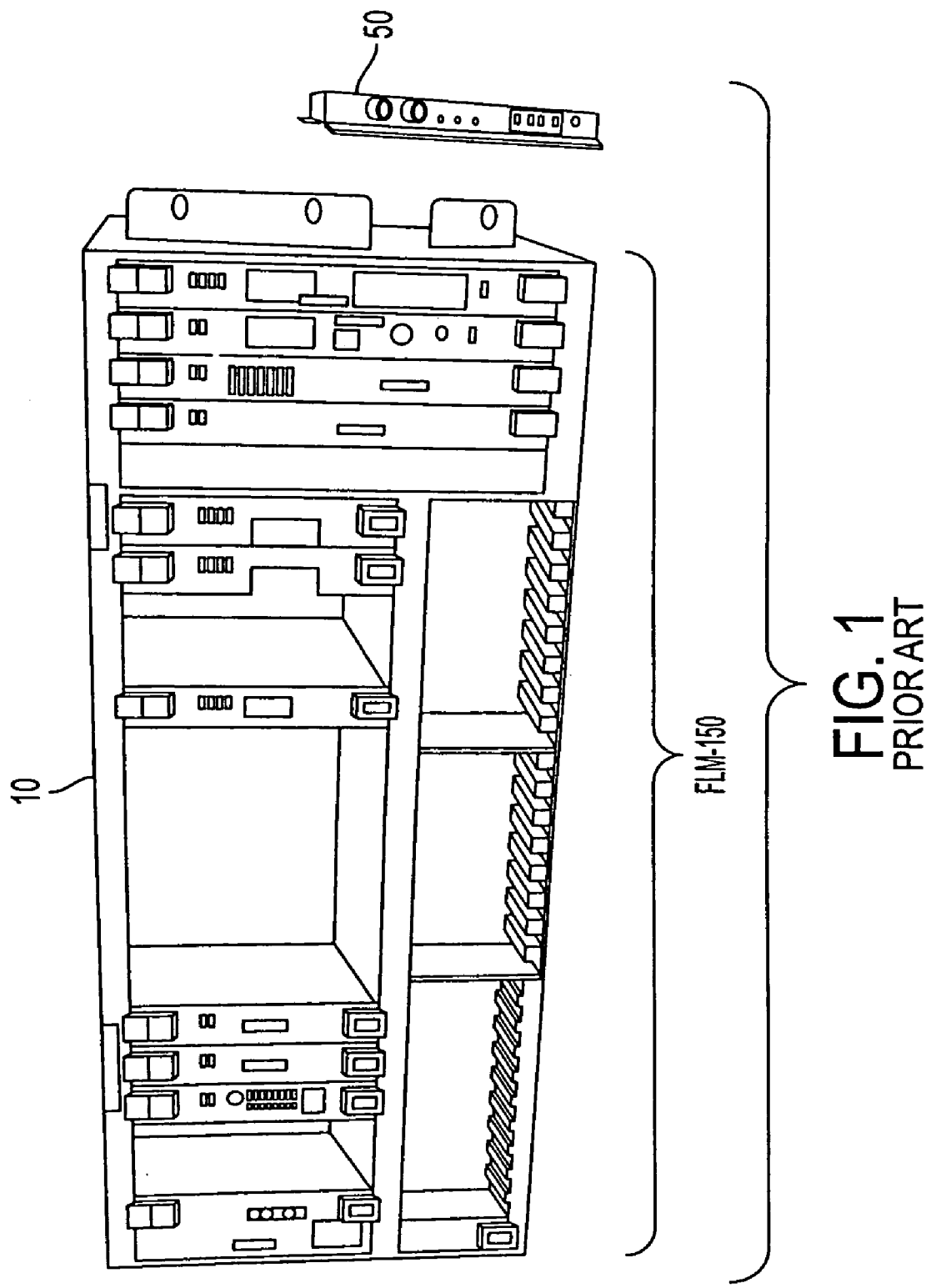
FIG. 1 depicts a conventional SONET multiplexer.

FIGS. 1A, 1B and 1C illustrate a hardware block diagram for the O3-3D3 MUX 50. The FPGA is represented as a number of modules (e.g., the OC3ALARM_TOP module 130, the ADD_ADROP_TOP module 132 the MICRO_TOP module 134, the FEAC_TOP module 136, and the DS3 ALARM_TOP module 138, among others). Throughout FIG. 11, the FPGA is indicated in phantom and referred to generally as the FPGA 96.

Figures 2, 11B:
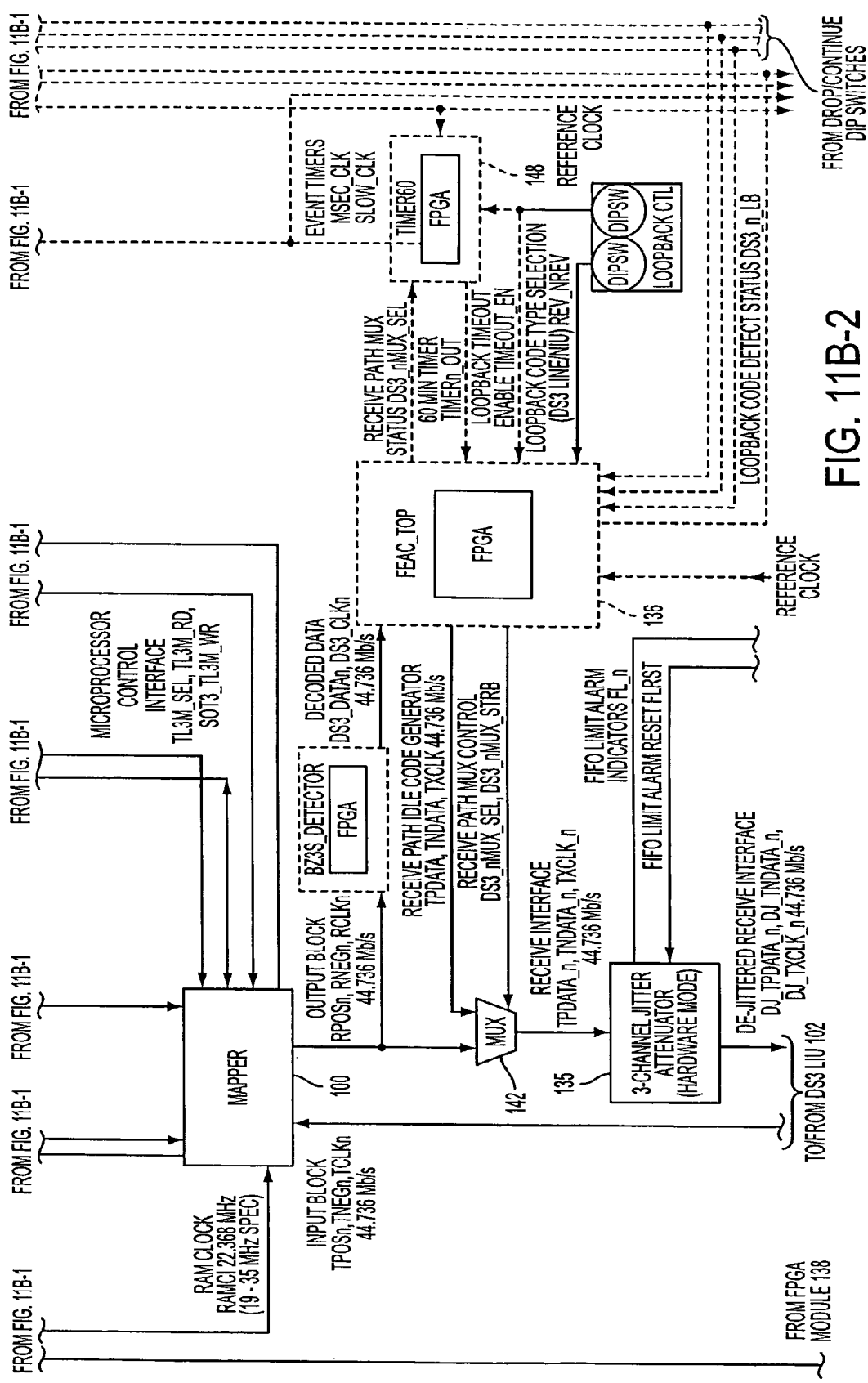
Figure 11C:
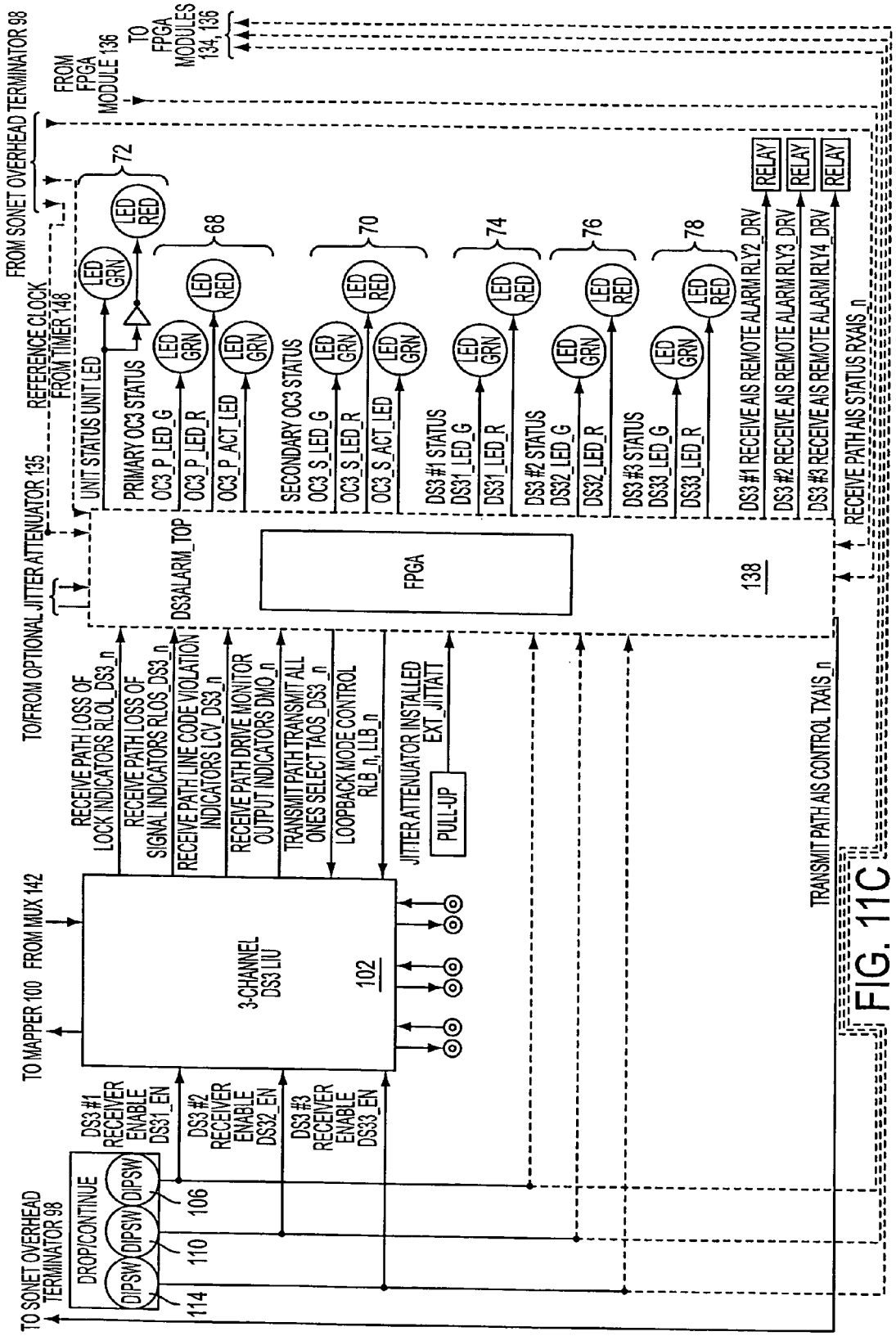
Figure 12:
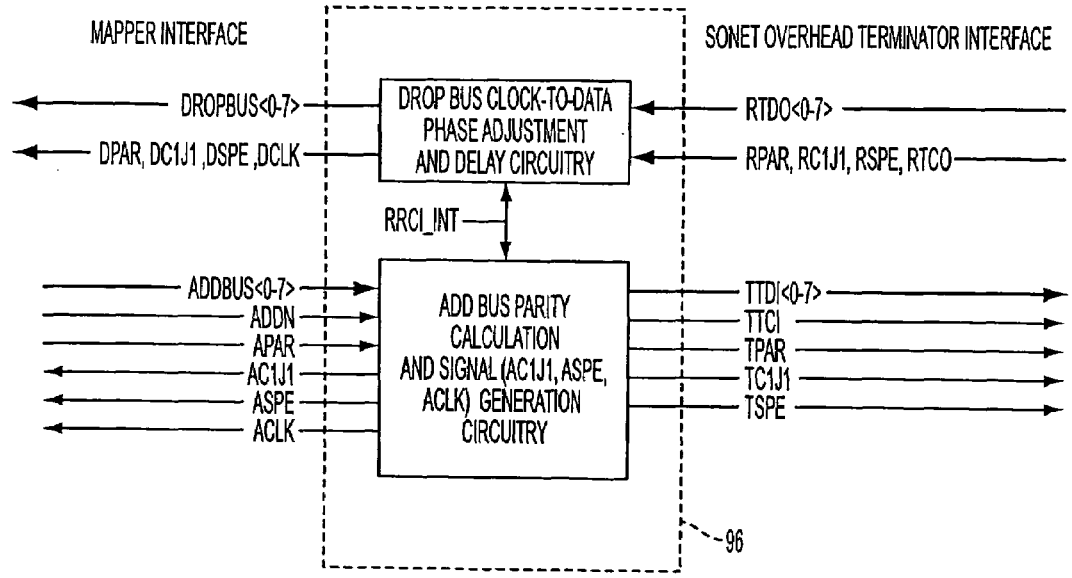
FIG. 12 is a block diagram depicting an add/drop bus signal processing function associated with the FPGA and other components depicted in FIGS. 11A-C.

The block diagram shown in FIG. 12 illustrates the logical association of the bus structures between the SONET overhead terminator 98 and mapper 100 devices in FIG. 11. The first process to be discussed is the processing of RX Terminal data from the SONET overhead terminator 98 device. This function involves aligning the RX Terminal signals (RTDO(n), RPAR, RC1J1, RSPE and RTCO) phase relationships so that the output phase characteristics of the SONET overhead terminator 98 device signals are matched to the input signal phase requirements of the mapper 100 Drop-Bus interface (DROPBUS(n), DPAR, DC1J1, DSPE and DCLK).

As seen in FIG. 12, the ACLK, ASPE and AC1J1 are inputs to the mapper 100 device. These signals are created inside the FPGA 96.

The timing requirements of the SONET overhead terminator TX Terminal interface will now be discussed. The TTCI clock signal is internally generated by the FPGA. This signal is used to control the TX Terminal data timing to the SONET overhead terminator 98. The TTCI, TC1J1 and TSPE signals are based on timing signal that are internally generated from the ADD-Bus interface. These signals are delayed and time aligned with the data and re-calculated parity prior to being placed on the TX Terminal Bus interface.

Figure 13:
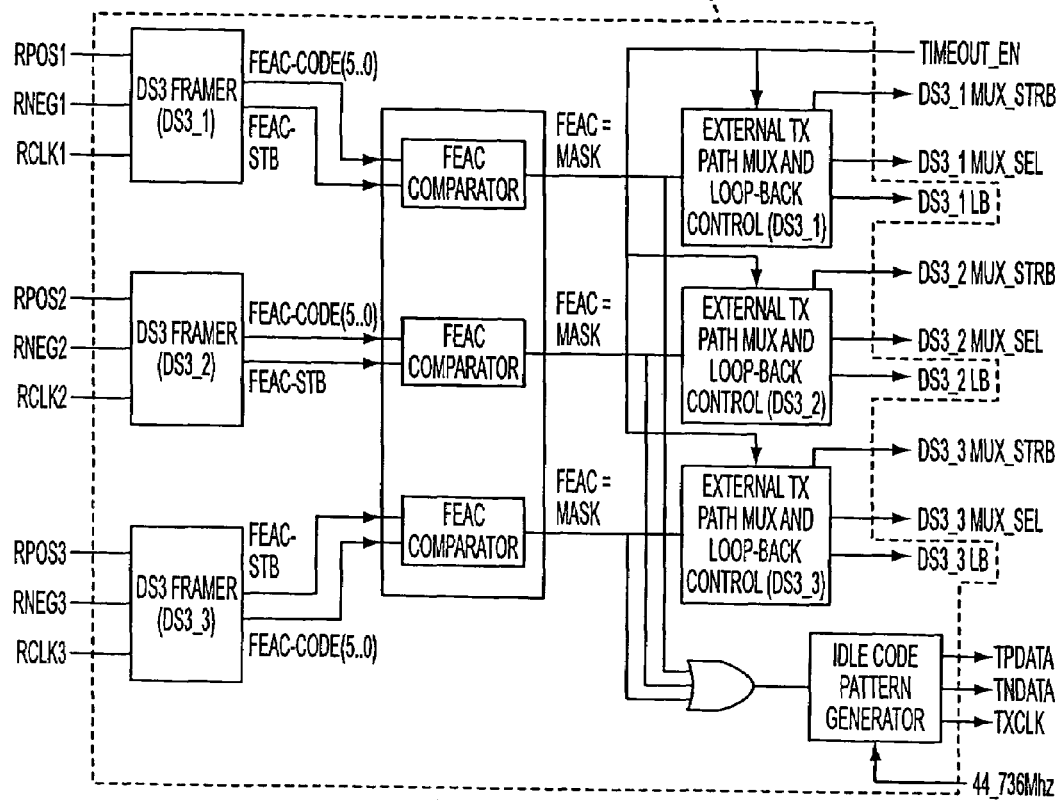
FIG. 13 is a block diagram depicting an FEAC code detector and DS3 (n) TX MUX/loopback control function associated with the FPGA and other components depicted in FIGS. 11A-C.

The block diagram in FIG. 13 illustrates the signal flow and sub-functions for the FEAC Code Detector and DS3(n) TXMUX Loop-back Control module 136 functional block. The signal inputs are being used to monitor the for the unique FEAC code sequences (Activate Loop-back/De-Activate Loop-back) that are being received by the O3-3D3 unit 50 via the SONET interface. Individual framers attached to each interface (RPOS(n), RNEG(n) and RCLK(n) signals) synchronize to the DS3 frame structure and then extract the FEAC code sequence. The FEAC code is then presented at the framer output, along with a strobe signal. The FEAC code at this output point remains essentially constant as long as the received code does not change. If any other code is detected, the framer latches the new FEAC code, along with a strobe signal to the outputs of the framer.

If the FEAC code on the framer outputs match the unique "proprietary Activate Loop-back code" previously discussed, the FPGA 96 forces the DS3(n) interface of the mapper 100 into a "Loop-back mode". This condition is maintained until such a time as the FPGA 96 detects the correct "Release Loop-back Code" on the TX DS3(n) interface (e.g., the RPOS(n), RNEG(n) and RCLK(n) signals). At this time, the FPGA 96 de-asserts the DS3_*LB signal(s). De-asserting the DS3_*LB signal(s) allows the normal DS3 alarm processing function to resume.

Another function performed by the FPGA 96 is the processing of OC-3 alarm conditions and the control of a RX Data multiplexer used to perform protection switching functions. As stated above, the SONET MUX 50 has a second optical data path (e.g., e.g., optical transceiver 90', CDRU 92' and optical line interface 94' shown in FIG. 9). As shown in FIG. 11A, the inputs to the transceivers 90 and 90' are processed by SONET synchronizers 131 and 132.

As soon as an OC-3 alarm condition is detected in one (e.g., the active path) of the optical transceiver inputs, the FPGA 96 integrates the alarms to determine if the alarm condition is momentary or continuous. If the alarm condition is determined to be continuous, the FPGA 96 accomplishes a "protection switch" to the "inactive trunk".

Another mechanism by which a "switch to protection" can be accomplished by the O3-3D3 MUX 50 is through the interpretation of the received APS (Automatic Protection Switching) bytes (K1 & K2) contained in the Line Overhead of the SONET frame. The APS configuration that the O3-3D3 MUX 50 uses is referred to as a "1+1 Unidirectional Architecture". This architecture is defined as having the transmitted signal continuously bridged on both the Active and In-active data paths. The receive data paths are monitored independently and identically for failures.

Figure 14:
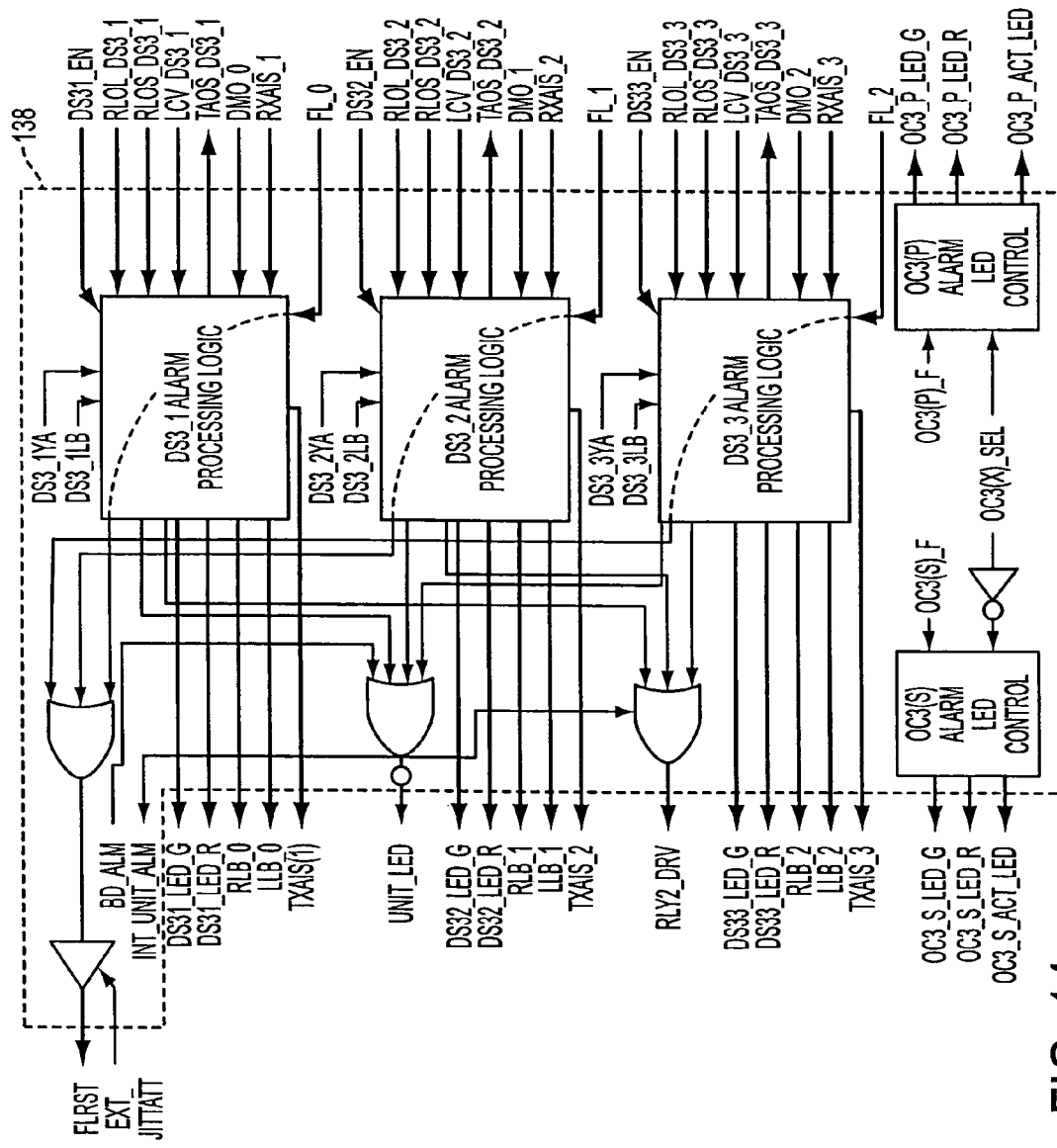
FIG. 14 is a block diagram depicting DS3 alarm processing and alarm relay/front panel LED control functions associated with the FPGA and other components depicted in FIGS. 11A-C.

FIG. 14 illustrates the interaction between the DS3(n) alarm inputs, their associated front-panel LEDs 74, 76 and 78 and the alarm relay used to indicate DS3(n) alarm conditions. Also shown in FIG. 14 is the relationship between the OC3 Alarm Processing block module 130 signals (BD_ALM, OC3(P)_F, OC3(S)_F and OC3(x)_SEL) and their associated front-panel LEDs 66 and 68.

The DS3(n) alarm inputs consist of RLOL_DS3_(n), RLOS_DS3_(n), LCV_DS3_(n), DMO_(n) and RXAIS_(n). These alarms are used to determine the location of the detected alarm condition. The DS3(n)_EN signal is also used to determine the necessity of processing any alarms from the individual DS3 ports (based on the state of the DS3(n)_EN control input). The state of the DS3(n)_EN signal is also used to determine the output drive level of the RLB_(n) and LLB_(n) signals. If the DS3(n)_EN signal level is logic 'low', the state of RLB_(n) and LLB_(n) will be logic 'low'. If the DS3(n)_EN signal level is logic 'high', the state of RLB_(n) and LLB_(n) is logic 'high'.

In the event that the FPGA 96 detects a valid DS3(n) alarm condition, the FPGA drives pre-defined outputs to indicate the alarm. These outputs control the states of front-panel LEDs, alarm relays and, if necessary, input control pins of the mapper 100.

If an alarm condition is detected, and is determined to be associated with some alarm condition that is identified as a unit-level problem, the FPGA 96 will drive a pre-defined signal to indicate a unit-level alarm condition.

The functions associated with timer module 148 (FIG. 11B) are to provide:

(1) 60 minute loop-back time-out timer function (controlled by TIMEOUT_EN signal) for the DS3(n) interface being remotely tested by the NOC (Network Operation Control) center; and
(2) Integration timer for reduction of "protection switching chatter" of alarm/status indicators on the OC-3 data paths.

The 60 minute loop-back time-out timer function is used to prevent the remotely activated maintenance loop-back from being continuously active in the event of NOC personnel mistakenly leave the DS3(n) trunk in a test condition. This function is user-controllable by an activate/defeat switch located on the main board 52.

In the event that the customer "activates" this option, and that a loopback activation period of greater than 60 minutes is detected, the MUX 50 automatically returns the DS3(n) trunk being tested to the "non-looped-back" state of operation. At this time, the DS3_*LB signal changes from its' "active high" logic level to its' "inactive low" logic level. If this option is not "active", the DS3(n) trunk being tested will remain in the loop-back state until a "De-Activate Loop-back" FEAC code is detected by the FEAC comparator circuitry (FIG. 12).

Alarm Processing is described in Table 5.

TABLE 5

Alarm Matrix (Alarm Relays and Front Panel LEDs')

| | | | | Front Panel LEDs' | | | | | | |
|---|---|---|---|---|---|---|---|---|---|---|
| Alarm Condition | OC3 RLY1 | DS3 RLY2 | UNIT | OC3 (P) | OC3 (S) | ACT (P) | ACT (S) | DS3 1 | DS3 2 | DS3 3 |
| 1. NO ALARMS (OC3_P ACTIVE) | INAC | INAC | GRN | GRN | GRN | ON | OFF | GRN | GRN | GRN |
| 2. ALARM ACTIVE (OC3_P ERROR) | ACT | INAC | GRN | RED | GRN | OFF | ON | GRN | GRN | GRN |
| 3. ALARM ACTIVE (OC3_S ERROR) | ACT | INAC | GRN | GRN | RED | ON | OFF | GRN | GRN | GRN |
| 4. ALARM ACTIVE (DS3_1 ERROR) | INAC | ACT | GRN | GRN | GRN | ON | OFF | RED | GRN | GRN |
| 5. ALARM ACTIVE (DS3_2 ERROR) | INAC | ACT | GRN | GRN | GRN | ON | OFF | GRN | RED | GRN |
| 6. ALARM ACTIVE (DS3_3 ERROR) | INAC | ACT | GRN | GRN | GRN | ON | OFF | GRN | GRN | RED |
| 7. NO ALARMS (DS3_1 OUTSERV.) | INAC | INAC | GRN | GRN | GRN | ON | OFF | OFF | GRN | GRN |
| 8. NO ALARMS (DS3_2 OUTSERV.) | INAC | INAC | GRN | GRN | GRN | ON | OFF | GRN | OFF | GRN |
| 9. NO ALARMS (DS3_3 OUTSERV.) | INAC | INAC | GRN | GRN | GRN | ON | OFF | GRN | GRN | OFF |
| 10. ALARM ACTIVE (DS3_1 ERROR) | INAC | ACT | GRN | GRN | GRN | OFF | ON | RED | GRN | GRN |
| 11. ALARM ACTIVE (DS3_2 ERROR) | INAC | ACT | GRN | GRN | GRN | OFF | ON | GRN | RED | GRN |
| 12. ALARM ACTIVE (DS3_3 ERROR) | INAC | ACT | GRN | GRN | GRN | OFF | ON | GRN | GRN | RED |
| 13. NO ALARMS (DS3_1 OUTSERV.) | INAC | INAC | GRN | GRN | GRN | OFF | ON | OFF | GRN | GRN |
| 14. NO ALARMS (DS3_2 OUTSERV.) | INAC | INAC | GRN | GRN | GRN | OFF | ON | GRN | OFF | GRN |
| 15. NO ALARMS (DS3_3 OUTSERV.) | INAC. | INAC. | GRN | GRN | GRN | OFF | ON | GRN | GRN | OFF |
| 16. UNIT FAILURE (NO CARR. FAULT) | ACT. | ACT. | RED | GRN | GRN | ON | OFF | GRN | GRN | GRN |

NOTE:
Alarm conditions 4 through 9 AND 16 have the OC3_(P) trunk active.
Alarm conditions 10 through 15 have the OC3_(S) trunk active.

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:
1. A SONET multiplexer comprising:
a first OC3 port operable to receive and transmit optical signals;
a second OC3 port operable to receive and transmit optical signals;
at least one DS3 port operable to receive and transmit electrical signals;
a first optical interface to receive an optical signal via said first OC3 port and convert it into an electrical signal;
a second optical interface to receive an optical signal via said second OC3 port and convert it into an electrical signal;
a SONET synchronizer operable to evaluate bits in said electrical signal received from a selected one of said first optical interface and said second optical interface and detect at least one of a plurality of SONET conditions comprising loss of signal, loss of frame and out of frame;
a SONET overhead terminator configured to locate SONET frames in said electrical signal received from said selected optical interface and extract selected overhead bytes in said SONET frames;
a mapper operable to use data from said electrical signal received from said selected optical interface and said selected overhead bytes to generate a plurality of DS3 streams;
a line interface unit operable to convert the said DS3 streams into respective analog signals for transmission from said at least one DS3 port, said line interface unit being operable to receive analog signals via said at least one DS3 port and convert them to corresponding digital signals, said mapper being operable to format said digital signals as a SONET stream, said SONET overhead terminator being operable to append selected overhead bytes to said SONET stream, and said SONET synchronizer being operable to prepare said SONET stream for transmission via a selected one of said first optical interface and said second optical interface and the corresponding one of said first OC3 port and said OC3 second port; and a processing device operable in conjunction with said mapper, said SONET overhead terminator, said SONET synchronizer, said first optical interface and said second optical interface to perform switch protection using said first OC3 port and said second OC3 port, respectively, as one of a primary circuit and a protection circuit.

2. A SONET multiplexer as claimed in claim 1, wherein said SONET synchronizer is operable to monitor respective electrical signals received via said first OC3 port and said second OC3 port for alarm conditions, and said processing device is operable in response to alarm conditions indicated by said SONET synchronizer to automatically switch operation from one of said first OC3 port and said second OC3 port to the other, depending on which of said first OC3 port and said second OC3 port was operating as said primary path.

3. A SONET multiplexer as claimed in claim 1, wherein said SONET multiplexer is operable to automatically switch between said first OC3 port and said second OC3 port for switch protection without being provisioned to do so.

4. A SONET multiplexer as claimed in claim 1, wherein said SONET multiplexer is deployed as a single card dimensioned for deployment in a single card slot in a shelf of a telecommunications bay.

5. A SONET multiplexer as claimed in claim 4, wherein said single card employs Type 400 mechanics.

6. A SONET multiplexer as claimed in claim 4, wherein said first OC3 port and said second OC3 port are integral components of said single card.

7. A SONET multiplexer as claimed in claim 1, wherein said processing device is a field programmable array device.

8. A SONET multiplexer as claimed in claim 1, wherein said processing device is operable to monitor Automatic Protection Switching bytes in the Line Overhead of a SONET frame received via one of said first OC3 port and said second OC3 port.

9. A SONET multiplexer as claimed in claim 1, wherein said processing device is operable to integrate at least one alarm generated by said SONET multiplexer in response to one of said alarm conditions to determine if it is momentary or continuous, said step of automatically switching being performed if said one of said alarm conditions is continuous.

10. A SONET multiplexer comprising:
a first OC3 port operable to receive and transmit optical signals;
a second OC3 port operable to receive and transmit optical signals;
at least one DS3 port operable to receive and transmit electrical signals;
a first optical interface to receive an optical signal via said first OC3 port and convert it into an electrical signal;
a second optical interface to receive an optical signal via said second OC3 port and convert it into an electrical signal;
a SONET overhead terminator configured to locate SONET frames in said electrical signal received from a selected one of said first optical interface and said second optical interface and extract selected overhead bytes in said SONET frames;
a mapper operable to use data from said electrical signal received from said selected optical interface and said selected overhead bytes to generate a plurality of DS3 streams;
a line interface unit operable to convert the said DS3 streams into respective analog signals for transmission from said at least one DS3 port, said line interface unit being operable to receive analog signals via said at least one DS3 port and convert them to corresponding digital signals, said mapper being operable to format said digital signals as a SONET stream, said SONET overhead terminator being operable to append selected overhead bytes to said SONET stream, and a selected one of said first optical interface and said second optical interface being operable to prepare said SONET stream for transmission via the corresponding one of said first OC3 port and said second OC3 port; and
a processing device operable in conjunction with said mapper, said SONET overhead terminator, said first optical interface and said second optical interface to perform switch protection using said first OC3 port and said second OC3 port, respectively, as one of a primary circuit and a protection circuit.

11. A SONET multiplexer as claimed in claim 10, further comprising a SONET synchronizer operable to evaluate bits in said electrical signal received from either of said first optical interface and said second optical interface and detect at least one of a plurality of SONET conditions comprising loss of signal, loss of frame and out of frame, and to prepare said SONET stream for transmission.

12. A SONET multiplexer as claimed in claim 10, wherein said SONET synchronizer is operable to monitor respective electrical signals received via said first OC3 port and said second OC3 port for alarm conditions, and said processing device is operable in response to alarm conditions indicated by said SONET synchronizer to automatically switch operation from one of said first OC3 port and said second OC3 port to the other, depending on which of said first OC3 port and said second OC3 port was operating as said primary path.

* * * * *